United States Patent
Cox et al.

(10) Patent No.: US 8,788,308 B1
(45) Date of Patent: Jul. 22, 2014

(54) EMPLOYEE SCHEDULING AND SCHEDULE MODIFICATION METHOD AND APPARATUS

(75) Inventors: Joseph S. Cox, Omaha, NE (US);
Steven J. Medina, Omaha, NE (US);
Robert Streich, Minneapolis, MN (US)

(73) Assignee: West Corporation, Omaha, NE (US)

( * ) Notice: Subject to any disclaimer, the term of this patent is extended or adjusted under 35 U.S.C. 154(b) by 1951 days.

(21) Appl. No.: 10/812,857

(22) Filed: Mar. 29, 2004

(51) Int. Cl.
*G06Q 10/00* (2012.01)
*G06Q 10/06* (2012.01)

(52) U.S. Cl.
CPC ............ *G06Q 10/063116* (2013.01); *G06Q 10/063118* (2013.01); *G06Q 10/06312* (2013.01); *G06Q 10/06313* (2013.01); *G06Q 10/06315* (2013.01); *G06Q 10/06* (2013.01); *G06Q 10/063112* (2013.01); *G06Q 10/063114* (2013.01)
USPC ........ 705/7.16; 705/7.17; 705/7.22; 705/7.23; 705/7.25; 705/7.13; 705/7.14; 705/7.15

(58) Field of Classification Search
CPC ............ G06Q 10/063116; G06Q 10/063118; G06Q 10/06312; G06Q 10/06313; G06Q 10/06315; G06Q 10/063112; G06Q 10/063114
USPC ..................... 705/7.16, 7.17, 7.22, 7.23, 7.25
See application file for complete search history.

(56) References Cited

U.S. PATENT DOCUMENTS

| | | | |
|---|---|---|---|
| 3,883,970 A | | 5/1975 | Campbell |
| 4,347,568 A | * | 8/1982 | Giguere et al. ............... 600/300 |
| 4,700,295 A | * | 10/1987 | Katsof et al. ................. 705/7.13 |
| 4,845,625 A | * | 7/1989 | Stannard ............................ 705/5 |
| 4,852,001 A | | 7/1989 | Tsushima et al. |
| 4,937,743 A | * | 6/1990 | Rassman et al. ............. 705/7.22 |
| 5,006,983 A | * | 4/1991 | Wayne et al. ................. 705/7.13 |
| 5,053,970 A | | 10/1991 | Kurihara et al. |
| 5,111,391 A | * | 5/1992 | Fields et al. .................. 705/7.14 |
| 5,124,912 A | | 6/1992 | Hotaling et al. |
| 5,212,791 A | * | 5/1993 | Damian et al. ................... 705/29 |
| 5,216,593 A | * | 6/1993 | Dietrich et al. ............... 345/467 |
| 5,270,920 A | | 12/1993 | Pearse et al. |

(Continued)

OTHER PUBLICATIONS

Kuhn et al, The Hungarian method for the assignment problem, Naval Research Logistics Quaterly, V2, l1-2, pp. 83-97, 1955 http://onlinelibrary.wiley.com/doi/10.1002/nay.3800020109/abstract.*

(Continued)

*Primary Examiner* — Justin M Pats
*Assistant Examiner* — Octavian Rotaru

(57) ABSTRACT

The present invention provides a method and apparatus for establishing, maintaining, distributing, and modifying an employee schedule. In one embodiment, the present invention comprises a scheduling system programmed in software and configured to run on a scheduling computer. One or more remotely located overhead displays and one or more remotely located employee interfaces or kiosks communicate with the scheduling computer to disseminate schedule data to employees. The kiosks are additionally configured to provide an interactive interface for employees to utilize system features. One exemplary system feature comprises computerized posting of sheets requesting worker sign-up for additional or reduced work hours based on projected workload. Another exemplary system feature comprises a shift pool wherein employees may post one or more of their work shifts to an employee accessible pool. Other employees may then accept the posted shift via an employee interface thereby facilitating automated work shift changes. Another exemplary system feature comprises an automated attendance module. The automated attendance module compares employee schedule data to data regarding which employees are actually at work or actually working. In this manner, attendance of employees is taken.

3 Claims, 14 Drawing Sheets

(56) References Cited

U.S. PATENT DOCUMENTS

| | | | | |
|---|---|---|---|---|
| 5,289,368 A * | 2/1994 | Jordan et al. | | 705/7.13 |
| 5,291,394 A * | 3/1994 | Chapman | | 705/7.26 |
| 5,303,144 A * | 4/1994 | Kawashima et al. | | 705/7.13 |
| 5,311,423 A * | 5/1994 | Clark | | 705/7.22 |
| 5,319,781 A * | 6/1994 | Syswerda | | 705/7.25 |
| 5,325,292 A * | 6/1994 | Crockett | | 705/7.18 |
| 5,329,444 A * | 7/1994 | Takahashi et al. | | 705/7.26 |
| 5,343,387 A * | 8/1994 | Honma et al. | | 705/7.14 |
| 5,343,388 A * | 8/1994 | Wedelin | | 705/7.13 |
| 5,369,570 A * | 11/1994 | Parad | | 705/7.13 |
| 5,381,332 A * | 1/1995 | Wood | | 705/7.25 |
| 5,459,657 A * | 10/1995 | Wynn et al. | | 705/32 |
| 5,467,268 A * | 11/1995 | Sisley et al. | | 705/7.16 |
| 5,497,141 A * | 3/1996 | Coles et al. | | 340/309.7 |
| 5,499,291 A | 3/1996 | Kepley | | |
| 5,508,977 A * | 4/1996 | Tymn | | 368/10 |
| 5,524,077 A * | 6/1996 | Faaland et al. | | 705/7.21 |
| 5,557,515 A | 9/1996 | Abbruzzese et al. | | |
| 5,606,695 A * | 2/1997 | Dworzecki | | 705/7.12 |
| 5,615,121 A | 3/1997 | Babayev et al. | | |
| 5,617,342 A | 4/1997 | Elazouni | | |
| 5,623,404 A * | 4/1997 | Collins et al. | | 705/7.17 |
| 5,630,070 A * | 5/1997 | Dietrich et al. | | 705/7.23 |
| 5,696,702 A * | 12/1997 | Skinner et al. | | 702/186 |
| 5,712,984 A * | 1/1998 | Hammond et al. | | 705/4 |
| 5,717,867 A * | 2/1998 | Wynn et al. | | 705/32 |
| 5,737,728 A * | 4/1998 | Sisley et al. | | 705/7.16 |
| 5,748,907 A * | 5/1998 | Crane | | 705/2 |
| 5,764,981 A * | 6/1998 | Brice et al. | | 718/101 |
| 5,765,140 A * | 6/1998 | Knudson et al. | | 705/7.15 |
| 5,826,236 A * | 10/1998 | Narimatsu et al. | | 705/7.24 |
| 5,835,898 A * | 11/1998 | Borg et al. | | 705/7.12 |
| 5,842,182 A * | 11/1998 | Bonner et al. | | 705/32 |
| 5,860,067 A * | 1/1999 | Onda et al. | | 705/7.18 |
| 5,890,134 A * | 3/1999 | Fox | | 705/7.24 |
| 5,907,829 A * | 5/1999 | Kida | | 705/7.16 |
| 5,909,669 A * | 6/1999 | Havens | | 705/7.42 |
| 5,909,672 A * | 6/1999 | Madore et al. | | 705/32 |
| 5,911,134 A * | 6/1999 | Castonguay et al. | | 705/7.12 |
| 5,913,201 A * | 6/1999 | Kocur | | 705/7.17 |
| 5,918,207 A * | 6/1999 | McGovern et al. | | 705/321 |
| 5,943,652 A * | 8/1999 | Sisley et al. | | 705/7.25 |
| 5,960,406 A | 9/1999 | Rasansky et al. | | |
| 5,963,912 A * | 10/1999 | Katz | | 705/32 |
| 5,963,914 A * | 10/1999 | Skinner et al. | | 705/7.16 |
| 5,974,392 A * | 10/1999 | Endo | | 705/7.14 |
| 6,035,278 A * | 3/2000 | Mansour | | 705/7.19 |
| 6,044,355 A * | 3/2000 | Crockett et al. | | 705/7.39 |
| 6,049,776 A * | 4/2000 | Donnelly et al. | | 705/7.14 |
| 6,101,480 A * | 8/2000 | Conmy et al. | | 705/7.18 |
| 6,101,481 A * | 8/2000 | Miller | | 705/7.13 |
| 6,115,693 A | 9/2000 | McDonough | | |
| 6,119,097 A * | 9/2000 | Ibarra | | 705/7.42 |
| 6,192,346 B1 * | 2/2001 | Green | | 705/7.16 |
| 6,216,109 B1 * | 4/2001 | Zweben et al. | | 705/7.12 |
| 6,219,649 B1 * | 4/2001 | Jameson | | 705/7.12 |
| 6,249,715 B1 | 6/2001 | Yuri et al. | | |
| 6,256,651 B1 * | 7/2001 | Tuli | | 715/224 |
| 6,266,659 B1 * | 7/2001 | Nadkarni | | 705/7.16 |
| 6,269,355 B1 * | 7/2001 | Grimse et al. | | 706/46 |
| 6,275,812 B1 * | 8/2001 | Haq et al. | | 705/7.14 |
| 6,278,978 B1 * | 8/2001 | Andre et al. | | 705/7.13 |
| 6,289,340 B1 | 9/2001 | Puram et al. | | |
| 6,310,951 B1 * | 10/2001 | Wineberg et al. | | 379/265.06 |
| 6,320,956 B1 | 11/2001 | Cherry | | |
| 6,330,594 B1 * | 12/2001 | Swart | | 709/219 |
| 6,334,133 B1 | 12/2001 | Thompson et al. | | |
| 6,345,260 B1 * | 2/2002 | Cummings et al. | | 705/7.19 |
| 6,351,734 B1 * | 2/2002 | Lautzenheiser et al. | | 705/7.17 |
| 6,430,562 B1 * | 8/2002 | Kardos et al. | | 705/37 |
| 6,493,446 B1 | 12/2002 | Cherry | | |
| 6,578,005 B1 * | 6/2003 | Lesaint et al. | | 705/7.14 |
| 6,587,831 B1 * | 7/2003 | O'Brien | | 705/7.16 |
| 6,732,079 B1 * | 5/2004 | Kintner et al. | | 705/7.13 |
| 6,745,200 B2 * | 6/2004 | Starkey | | 707/812 |
| 6,823,315 B1 | 11/2004 | Bucci et al. | | |
| 6,912,346 B2 | 2/2005 | Green | | |
| 6,957,188 B1 * | 10/2005 | Dellevi et al. | | 705/7.14 |
| 6,970,829 B1 | 11/2005 | Leamon | | |
| 7,003,475 B1 * | 2/2006 | Friedland et al. | | 705/7.13 |
| 7,023,979 B1 | 4/2006 | Wu et al. | | |
| 7,058,589 B1 * | 6/2006 | Leamon et al. | | 705/7.13 |
| 7,218,974 B2 | 5/2007 | Rumi et al. | | |
| 7,233,919 B1 * | 6/2007 | Braberg et al. | | 705/32 |
| 7,660,406 B2 | 2/2010 | Fama et al. | | |
| 7,840,341 B1 * | 11/2010 | Sato et al. | | 701/423 |
| 2002/0023064 A1 * | 2/2002 | Grimse et al. | | 706/19 |
| 2002/0065700 A1 | 5/2002 | Powell et al. | | |
| 2002/0143601 A1 | 10/2002 | Sinex | | |
| 2003/0236692 A1 | 12/2003 | Hertel-Szabadi | | |
| 2005/0102154 A1 * | 5/2005 | Dodd et al. | | 705/1 |
| 2005/0137925 A1 * | 6/2005 | Lakritz et al. | | 705/8 |
| 2005/0222889 A1 | 10/2005 | Lai et al. | | |
| 2009/0083107 A1 | 3/2009 | Chen-Ritzo et al. | | |

OTHER PUBLICATIONS

Allimadi, Milton, Workforce Management Systems Respond to Challenges With More Sophisticated Products, Call Center Magazine, Apr. 1, 1999.

Brown, Dartanyan L., TeamAgenda Puts Groups on Schedule, MacWeek, Nov. 19, 1991, p. 8, v. 5, No. 40.

Durr, Bill, Inbound Scheduling Nightmares: Cursing the Darkness or Lighting a Candle, Telemarketing Magazine, Jan. 1, 1994, pp. 44-48, v. 12, No. 7.

Higgins, Steve, MediaWorks Offers Mac Work-Group Program, PC Week, Oct. 21, 1991, pp. 85, v. 8, No. 42.

West Teleservices 1996 Annual Report, 1997, p. 5, United States.

West Teleservices 1997 Annual Report, 1998, p. 6, United States.

West Teleservices 1998 Annual Report, 1999, p. 6-7, United States.

West Teleservices 1999 Annual Report, 2000, p. 3, United States.

University of California Human Resources and Benefits Deportment: "Personnel Policies for Staff Members". Jul. 1, 1998. <http://atyourservice.ucop.edu/employees/policies/staff_policies/soo33.html>.

University of Texas Health Science Center at Houston. "Shift Differential Pay". Nov. 1998. <http://uth.tmc.edu/ut_general/admin_fin/planning/pub/hoop/05/5_07.html>.

University of Houston Manual of Administrative Policies and Procedures. "Shift Differential Pay". Aug. 22, 1996. <http://www.uh.edu/mapp/02/020105pro.htm>.

University of Missouri Human Resources Policy Manual. "Shift Differential Compensation". Sep. 26, 1997. <http://umsystem.edu/departments/hr/manual/213.shtml>.

University Professional & Technical Employees Contract. "Article 35: Shift Differential". Jul. 12, 1997. <http://www.upte.org/tx/contract/art35shiftdif.html>.

RN. "Index of Employers (Hospital Profiles) (Nursing Opportunities Supplement)". Jan. 1988.

Business Computing Brief, Security System Minimises Baggage, Business Computing Brief, Feb. 2, 1995.

Hunt, Brooks, $99.95 Staff Scheduler With Smarts Covers Your Tasks, PC Magazine, May 16, 1989, v. 8, n. 9, p. 54(1).

* cited by examiner

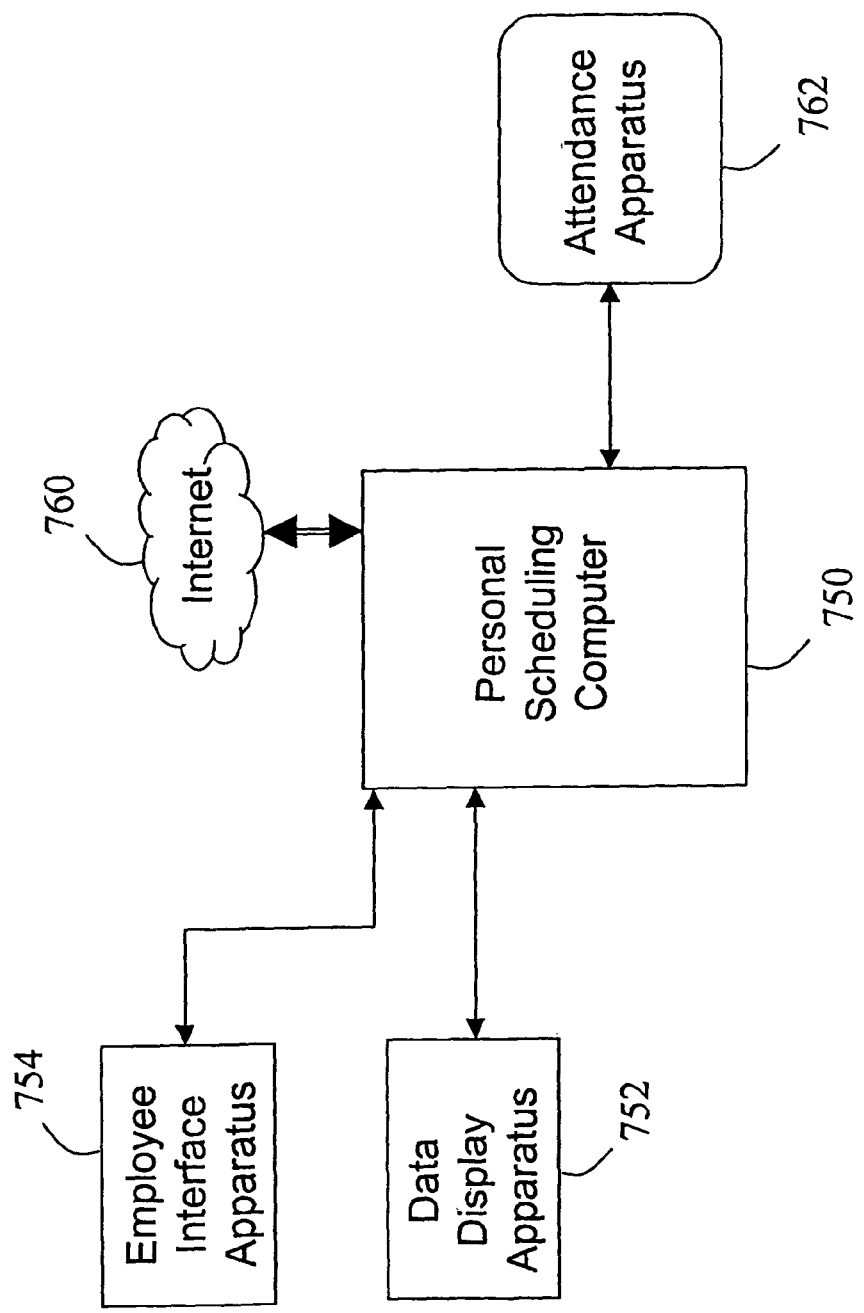

EMPLOYEE SCHEDULING AND SCHEDULE MODIFICATION METHOD AND APPARATUS

BACKGROUND

1. Field of the Invention

This invention relates generally to employee management tools and in particular to a system configured to manage the work schedules of a plurality of employees.

2. Background

Historically, management and scheduling of a large employee workforce has been a complex and time consuming task. With regard to scheduling large groups of employees, it is difficult to predict the number of employees required to adequately staff a particular shift. Once the number of required employees is determined, employees must each be assigned a work schedule. Scheduling employees can be a complex task as many different factors constrain which employees may be selected for a particular shift. For example, scheduling limitations exist regarding hours worked per week, hours worked per day, or other factors. Further, some employees are available to work only certain days and/or certain hours. In addition, employees may wish to take vacation time, or to schedule changes or to 'swap' shifts with another employee to take vacation or for other reasons. Further, certain shifts may unexpectedly require additional employees to meet unexpected increases in workload, or conversely, certain shifts may require fewer employees than previously anticipated.

With regard to the management of large numbers of employees, several additional complexities surface. First, it is often difficult to determine which employees are working and which employees are absent, on break, or tardy. Second, keeping track of schedule violations in a reliable and recordable manner is difficult when large numbers of employees are involved.

While these types of difficulties are particularly burdensome when managing large numbers of employees, similar difficulties arise when scheduling smaller numbers of employees.

Several attempts have been made to overcome these types of problems however, these attempts do not fully overcome the disadvantages of the prior art. For example, U.S. Pat. No. 5,499,291, issued to Kepley, describes a scheduling system that communicates an agent's schedule directly to the agent at the agent's terminal, thereby preventing the need for manual distribution. The schedule is presented to the agents via video displays that are at each agent's actual work station, and thus are available for viewing by a particular agent only when that agent is seated at his or her workstation. Furthermore, the Kepley reference does not provide means to account for schedule changes. Absent these features, a system based on the teachings of Kepley still suffers from many of the disadvantages of the prior art.

Likewise, U.S. Pat. No. 5,289,368, issued to Jordan et al, and U.S. Pat. No. 5,325,292, issued to Crockett, both of which share a common specification, describe systems and methods used to help schedule employee work shifts. However, the methods and apparatus of these systems still possess several disadvantages of the prior art. Among others, system configured according to the teachings of these references still (1) lack an ability to schedule based on employee and not shift, (2) lack an ability to provide the schedules on an employee distributed basis and (3) lack the ability to conveniently and easily deal with schedule changes.

As described below, the present invention overcomes the disadvantages of the prior art by providing a new method and apparatus for employee scheduling, schedule changes and employee attendance monitoring.

SUMMARY OF THE DISCLOSURE

In accordance with the purpose of the invention as broadly described herein there is provided an employee scheduling system for use in a work environment wherein the employee scheduling system facilitates the storage, distribution, and modification of employee schedules.

In one embodiment, the subject invention comprises a computer configured to execute software written to facilitate the creation, storage and retrieval of employee schedules. A manager may use any number of methods or various scheduling algorithms as known by those of ordinary skill in the art to calculate the number of employees required for a particular shift. Hence, based on input regarding previous work force requirements or anticipated work force requirements, the system creates employee schedules to meet the work force requirements. The system also includes various other features and aspects for accessing or revising the schedule data. Alternatively, schedule data may be imported into the scheduling software.

It is contemplated that a company or business having a plurality of employees would utilize the present invention to establish and maintain the employee schedules. In one embodiment, the employee schedules are created on an employee-by-employee basis instead of on a shift-by-shift basis. This provides the advantages of more flexible scheduling to meet employee needs and a more consistently engaged work force to meet the work flow needs of the company.

In one embodiment, a scheduling computer executes the scheduling software to achieve the functions of the present invention. The computer and software running thereon accept input from management including but not limited to employee files, workload data, and schedule changes. Also included in various embodiments of the scheduling system are one or more display monitors located remotely from the scheduling computer, one or more work stations or kiosks located remote from the scheduling computer, an attendance monitoring system configured to interface with the scheduling computer, and a remote access module configured to facilitate access to the scheduling data via telephone or computer network.

With regard to embodiments including display monitors, the computer communicates employee schedule data to the one or monitors for display of schedule data to employees. In one configuration, the monitors are large overhead-mounted video display monitors able to simultaneously visually communicate the schedule data to a plurality of individuals.

With regard to embodiments configured with one or more remote computer workstations or kiosks, an employee may manipulate the kiosk to cause the scheduling computer to communicate employee schedule data for display or printing on the kiosk. In addition, each kiosk provides means for the employees to offer and/or accept schedule changes or accept additional or reduced hours from management.

With regard to embodiments configured with an attendance monitoring module, the scheduling computer communicates with an attendance module having software running thereon. The attendance module comprises a system capable of determining which employees are present at work. A comparison is then made to determine employees scheduled but not working, employees working but not scheduled, and employees scheduled and working. Data resulting from this comparison is then fed back to the scheduling computer, which in turn may generate schedule changes in response to this data.

With regard to embodiments configured with a remote access interface or portal, the scheduling computer communicates with the remote access interface to facilitate the exchange of data over a telephone or a computer network, such as the Internet. This feature advantageously allows a remotely located employee to utilize the features of the scheduling system. In another embodiment, the remote access module is configured to facilitate a connection between one or more remote offices.

In various embodiments, the system may include the ability for management to transmit a request to the employees over one or more access points, such as kiosks or display monitors, requesting additional employees on a particular shift. This is referred to therein as the posting of a sheet by management. In response, the employees may optionally respond to the request at certain access points capable of receiving input, such as a kiosk.

In some embodiments, the system may support creation of a 'pool' of employee generated requests to change or shift their schedules. Other employees may then view the pool of available shifts, i.e. shift trade requests, and may optionally accept the shift change if their schedule and qualifications permits such a change.

BRIEF DESCRIPTIONS OF THE DRAWINGS

FIG. 14 illustrates an alternative example configuration of the present invention.

DETAILED DESCRIPTION OF ILLUSTRATIVE EMBODIMENTS

Overview

The present invention provides improved systems and methods for staffing, scheduling, and managing a plurality of employees. In one embodiment, the system includes at least one computer configured with software to receive work force requirement data and create schedules based on the work force requirement data using any of many various scheduling algorithms. Hence, based on input regarding previous work force requirements or anticipated work force requirements, the scheduling system creates employee schedules to meet the work force requirements. Alternatively, schedule data may be imported into the schedule software. The system also includes various other features and aspects for accessing or revising the schedule data.

Figure 1:
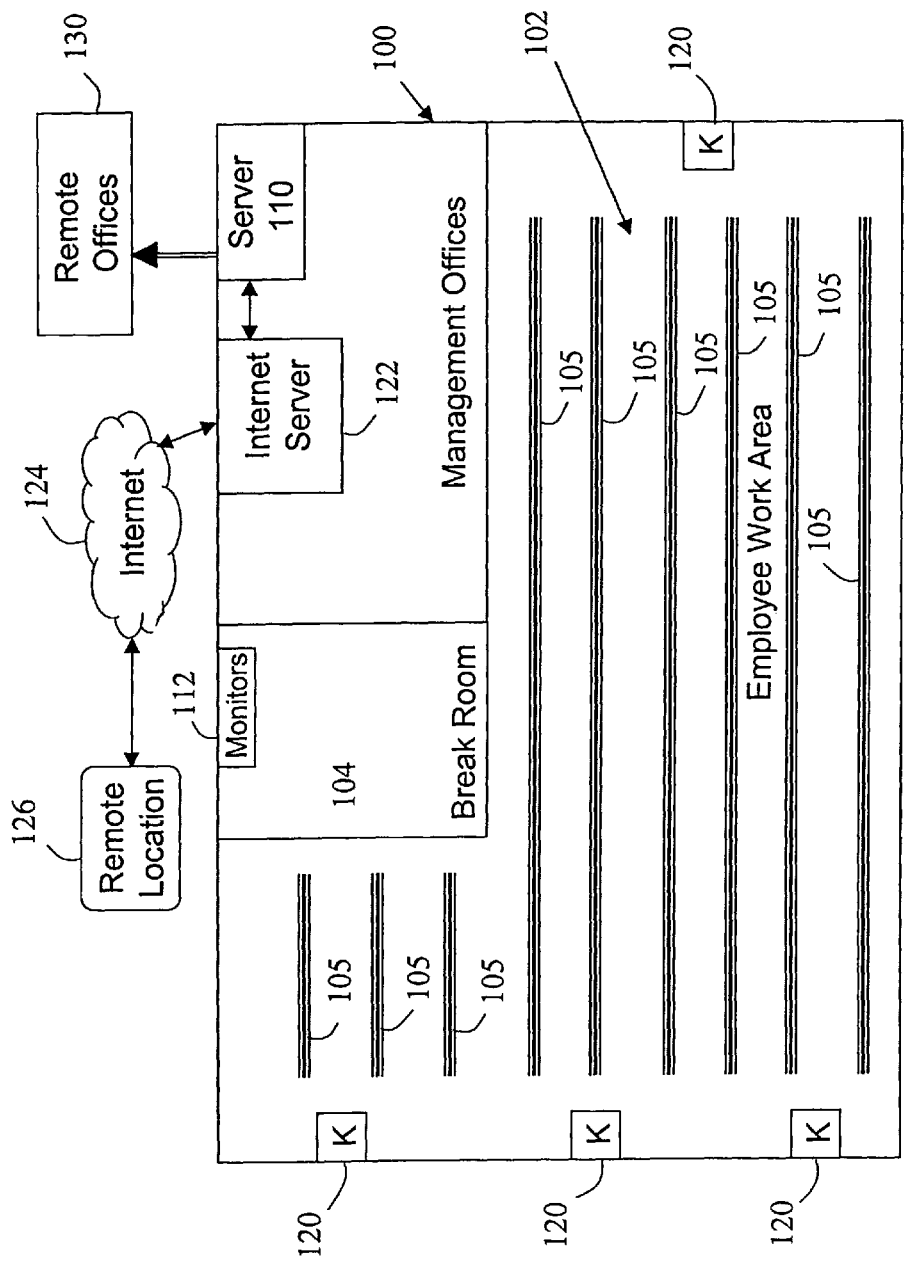
FIG. 1 illustrates a block diagram of an example environment of the present invention.

Although other applications are possible, one example environment in which the subject invention can be implemented is shown in FIG. 1. As shown, one example environment comprises a large office building or office complex having management offices 100 and employee work area 102. In this example environment the employee work area 102 comprises the floor of a telephone services operation, such as for receiving or placing telephone sales calls. The work area 102 includes rows 105 of stations, each station having a terminal (not shown). The office area also includes a break room 104.

For purposes of the present application, the term "management" is used in reference to a person of authority over workers or employees. In general, "management" or "managers" have a different level of authorization in the scheduling system than workers or employees, thereby providing managers access to features of the scheduling system that are inaccessible to workers or employees. In contrast, the terms "worker" and "employee", used interchangeably, refer to the individuals for whom schedules are created, maintained, and monitored. The difference between these terms will become apparent after reading the detailed description that follows.

Within the management office is a computer server 110 configured to execute software written to achieve the function of the present invention. The server 110 and software running thereon accept input from management including but not limited to employee files, workload data, and schedule changes. The server 110 communicates employee schedule data to one or more monitors 112 for display to employees. In one configuration, the monitors 112 are large overhead-mounted video display monitors able to simultaneously visually communicate the schedule data to a plurality of individuals.

In the example environment shown in FIG. 1, one or more computer workstations or kiosks 120 reside throughout the employee work area. Each kiosk 120 provides means for the employees to access and/or print their work schedules.

Included in this example environment is an Internet server 122 that connects to the Internet 124 or other computer network. The Internet server 122 facilitates connection to the scheduling system by one or more individuals or entities at one or more remote locations 126. For example, in this environment, employees located at their homes may connect to the scheduling system over the Internet to ascertain their work schedule or utilize other functions of the scheduling system of the present invention.

In the example environment shown here, the present invention also facilitates a connection to one or more remote offices 130. In the example environment shown, the remote office 130 comprises another telephone services call center located in another city.

Within this example environment of a telephone services call center, the system allows for access to the data via a number of 'access points', including but not limited to a worker's computer terminal (not shown), centrally located user-interactive kiosks 120, large display monitors 112, telephone, Internet 124, or electronic mail.

In various embodiments, the system may include the ability for management to transmit a request to the employees, over one or more access points, requesting additional employees on a particular shift. In response, the employees may optionally respond to the request at certain access points capable of receiving input.

In some embodiments, the system may support creation of a 'pool' of employee generated requests desiring to change or shift their schedules. Other employees may then view the pool of available shifts, i.e. shift change requests, and accept the shift change if their schedule and qualifications permits such a change.

Although the present invention is described above in an example embodiment of a telephone service call center, it is anticipated that the present invention may be utilized any of a number of different environments where it is desirable to manage two or more employees.

Example Embodiments

Figure 2:
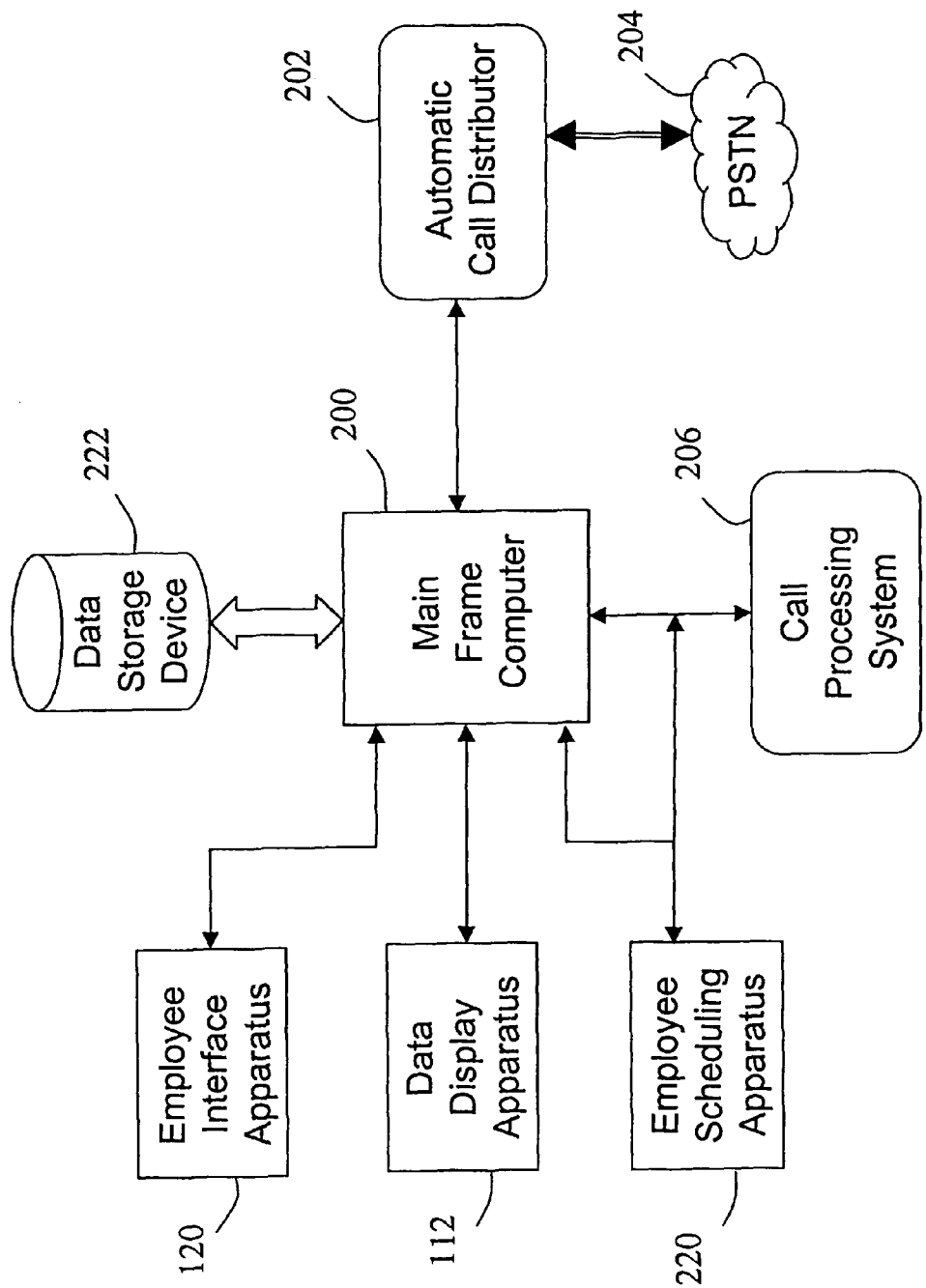
FIG. 2 illustrates a block diagram of an example configuration of the apparatus of the present invention.

FIG. 2 illustrates one example embodiment of the present invention in an illustrative environment of a telephone call processing center. As such, FIG. 2 illustrates a block diagram of the apparatus comprising such an example embodiment. As shown, the scheduling system interfaces with a central mainframe computer 200 such as a main computer that acts as the center of a company's computer network. In one configuration, the main computer 200 comprises an IBM® brand, Tandem® brand, or other similar mainframe computer operating under a UNIX®, Linux™, or Windows™ family, or other operating system. The particular configuration or apparatus of the main computer 200 is not significant to the present invention other than that it is preferably capable of the functions described herein. The main computer 200 interfaces with the scheduling system, coordinates the acceptance of calls into the call processing system, and communicates schedule data to the employee scheduling system components. For example, in this embodiment the employee scheduling system of the present invention utilizes the data storage, printing, and display facilities of main computer 200.

As the present invention is discussed herein in the environment of a call processing system, an automatic call distributor 202 connects intermediate the main computer 200 and the Public Switched Telephone Network (PSTN) 204. The automatic call distributor 202 accepts calls, such as calls from customers requesting to purchase an advertised product, via the PSTN 204. Upon receipt of a call, the automatic call distributor 202 may direct the call through the main computer 200 to a call processing system 206. The call processing apparatus provides means for an employee to service the call, such as by taking the telephone order.

In this illustrative embodiment, the present invention works in conjunction with the main computer 200, automatic call distributor 202, and call processing system 206. The present invention, while operating in conjunction with these systems, is generally independent from the call processing apparatus 206 and automatic call distributor 202, and is described in this example environment only for purposes of understanding.

The present invention thus comprises an employee scheduling apparatus 220 configured to execute software configured to achieve the functionality of the present invention. The software is described below in greater detail. In one embodiment, the employee scheduling apparatus 220 comprises a computer capable of interfacing with the main frame 200 and executing software. One such computer can be based on a Pentium™ or other suitable processor running a Windows™ family, UNIX™, Linux™, or other operating system. It is contemplated that the employee scheduling apparatus 220 includes at least one data entry device and at least one display device.

The employee scheduling apparatus 220 connects to the mainframe computer 200 and the call processing system 206, thereby allowing data exchange therebetween to allow the scheduling system to take "attendance" based on the activity of the call processing system. The attendance feature of the present invention is discussed below in greater detail.

The employee scheduling apparatus utilizes the main computer 200 to access one or more database storage devices 222, such as, by way of example and not limitation, hard disk drives, read/write optical storage, tape drives, and the like. As described below in greater detail, one configuration of the software utilizes the storage device 222 to store employee data, schedule data, and call statistic data.

Also connecting to the main computer 200 is a data display apparatus 112 and an employee interface 120. The data display apparatus 112 interfaces with the employee scheduling apparatus 120 via the main computer 200 to display scheduling data to employees. In one configuration, the data display apparatus 112 comprises a plurality of computer or television monitors mounted in an elevated location to facilitate viewing by a plurality of employees or workers.

The employee interface 120 provides for interactive access and interactive input by employees to the schedule data stored on data storage device 222. In reference to FIG. 1 and FIG. 2, it is contemplated that, in one embodiment, the employee interface 120 comprises a plurality of independent standalone systems, referred to hereinafter as kiosks. Each kiosk 120 may optionally contain a processor, embodied in a computer, with support software and hardware to facilitate communication with the data storage device 222. It is contemplated that each kiosk 120 include at least one user interface, such as a touch screen, keyboard, or mouse, one or more printers, and one or more display devices. A description of the operation and functionality of the kiosks 120 is provided below.

Figure 3:
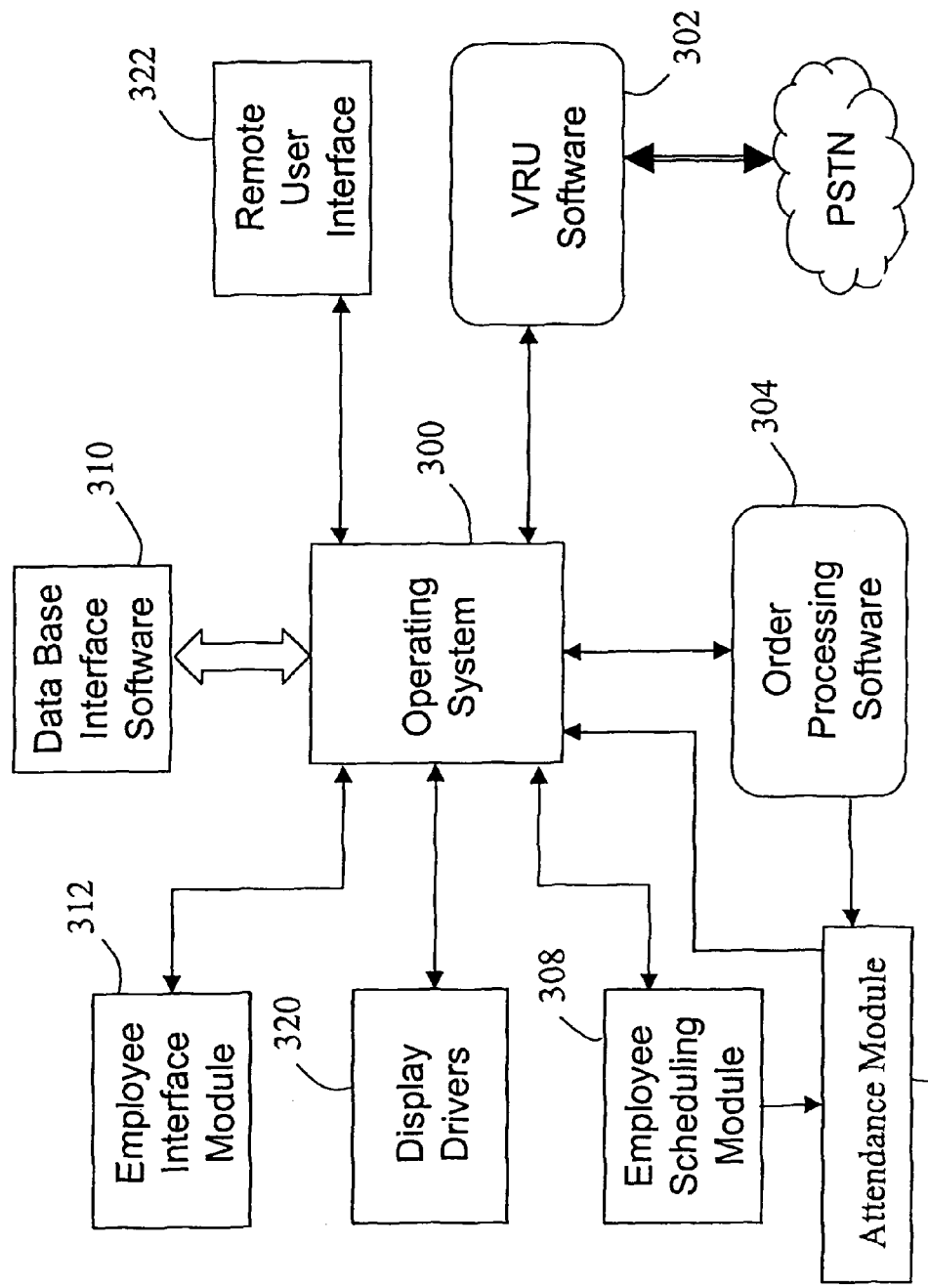
FIG. 3 illustrates a block diagram of an example configuration of the software interfaces of the present invention.

FIG. 3 illustrates a block diagram of the software modules and interfaces comprising the present invention. A more detailed discussion of the function of each software module is provided below. For purposes of discussion, the software modules shown on FIG. 3 operate in conjunction with the hardware components of FIG. 2.

As shown, operating system software 300 oversees operation of the main computer. As described above, the operating system 300 of the main computer 200 interfaces with VRU software 302 running on the automatic call distributor to automatically answer the incoming calls and distribute them to a telephone operator, i.e. employee. Each employee utilizes order-processing software 304 to service the telephone order.

Turning now to the software of the present invention, employee scheduling software 308 executes on the employee scheduling computer. An operator uses the employee scheduling software 308 to create and modify employee schedules. Detailed functionality of the software on the employee scheduling module 308 is provided below.

The employee scheduling software communicates with the database interface software 310 to access workload data for the creation of employee schedules. Once the employee schedules are created, the scheduling module 308 stores the employee schedule data on the database. Likewise, the database interface software 310 provides access to the database storage device if so requested by any of the employee scheduling software 308, employee interface software 312 operating on the kiosks, or when requested by the display drivers 320 for transmission to the one or more display devices 112.

The employee interface module 312 facilitates interaction by the employee with the scheduling data to view and print that individual's schedule data, and perform various other features described below in greater detail.

Also included in FIG. 3 is a remote user interface 322. It is contemplated that, in certain embodiments, a remote user interface 322 is in communication with the operating system 300, as shown, to facilitate access to the schedule data and the scheduling system from a remote location. Using the remote user interface 322, an employee or manager may access the scheduling system via a worldwide computer network such as the Internet or a telephone accessible voice response unit (not shown).

In conjunction with FIGS. 4-8, a more detailed discussion of the various components of each of the software modules is provided to aid in understanding the functionality of the present invention. FIGS. 10-14 and the associated discussion provide a description of one example method of operation of the illustrative embodiments of the present invention described herein.

Figure 4:
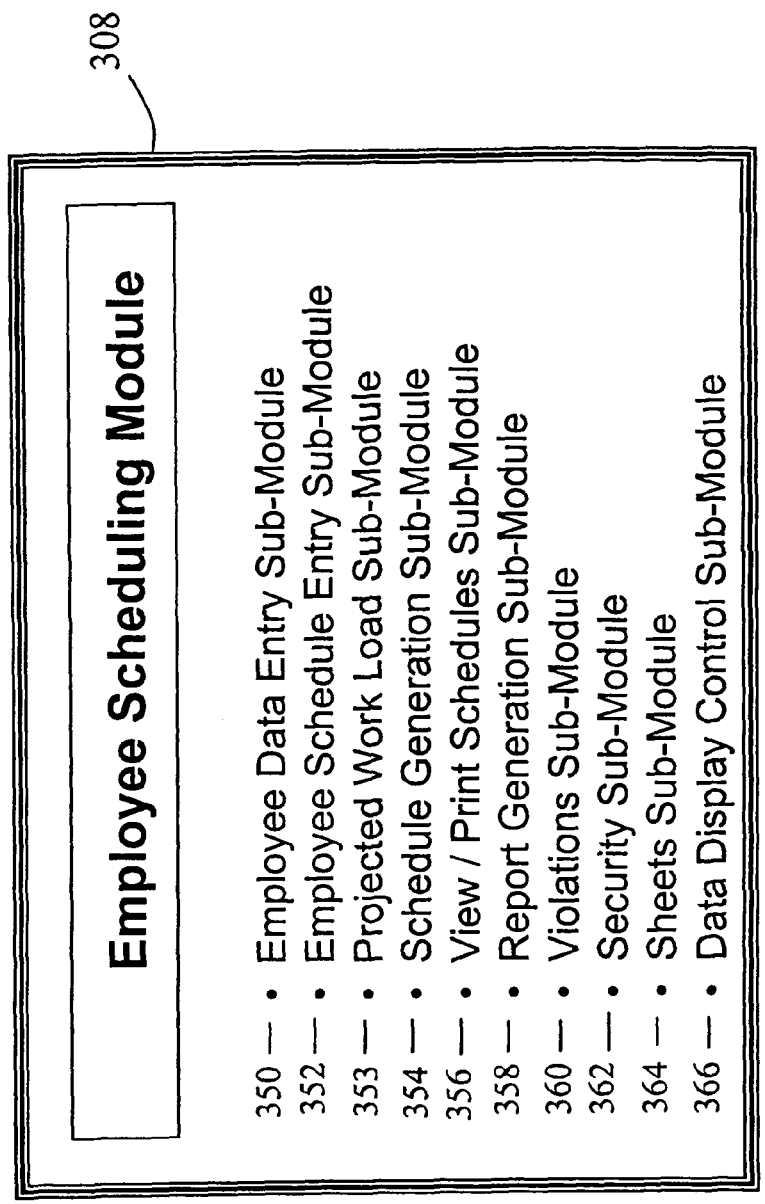
FIG. 4 illustrates exemplary sub-modules that comprise an example embodiment of the employee scheduling module.

Turning now to FIG. 4, an example configuration of the sub-modules of the employee schedule module 308 is shown. The sub-modules 350-366 comprise one illustrative collection of programmed options, enabled using software routines, that are available through the employee schedule module 308.

Employee Data Entry Sub-Module

In the example embodiments described herein, the employee schedule module 308 can access an employee data entry sub-module 350. The employee data entry sub-module 350 comprises a software configuration that is executable on the employee scheduling apparatus 220. The employee data entry sub-module 350 provides the interface for a manager to establish an employee record, enter/edit employee data and delete an employee record. The employee data entry sub-module communicates with at least the database interface software 310 to establish and/or modify an employee data record.

Employee Schedule Entry Sub-Module

In the example embodiments described herein, the employee schedule module 308 can access an employee schedule entry sub-module 352. The employee schedule entry sub-module 352 comprises a software configuration that is executable on the employee scheduling apparatus. The employee data entry sub-module 352 provides the interface for a manager to establish an employee schedule file, enter employee shifts and/or edit an employee schedule. The employee data entry sub-module 352 communicates with at least the database interface software 310 to establish and/or modify the schedule record.

Projected Workload Sub-Module

In the example embodiments described herein, the Employee Schedule Module 308 can access a projected workload sub-module 353. The projected workload sub-module 353 comprises a software configuration that can be accessed via the employee scheduling apparatus. The projected workload sub-module 353 provides the interface for a manager to establish or enter data regarding the projected or estimated workload required during a period. This data can be useful in generating the required schedules. The projected workload sub-module 353 communicates with at least the database interface software 310 to obtain various data, such as call statistic data. Means are also provided, such as data entry screens or file access capability, to obtain workload data from other sources. In this particular embodiment, workload data, discussed below in greater detail, comprises information regarding the number of calls that may arrive during a particular period.

Schedule Generation Sub-Module

In the example embodiments described herein, the employee schedule module 308 includes a schedule generation sub-module 354. The schedule generation sub-module 354 comprises a software configuration that is executable on the employee scheduling apparatus. The schedule generation sub-module 354 provides the interface for a manager to generate a schedule based on estimated or known future workload. The schedule generation sub-module 354 communicates with at least the database interface software 310 to obtain information regarding workload statistics and employee schedules. It is anticipated that various different systems using any number of different algorithms or scheduling routines can be utilized to generate the schedules of the present invention. Accordingly, the present invention is not limited to a particular method or apparatus for scheduling a workforce.

View/Print Schedules Sub-Module

In the example embodiments described herein, the employee schedule module 308 includes to a view/print schedules sub-module 356. The view/print schedules sub-module 356 comprises a software configuration that can be accessible from the employee scheduling apparatus. The view/print schedules sub-module 356 provides the interface for a manager to view or print a particular schedule. The view/print schedules sub-module 356 communicates with at least the database interface software 310 to obtain information regarding employee schedules.

Report Generation Sub-Module

In the example embodiment described herein, the employee schedule module 308 includes a report generation sub-module 358. The report generation sub-module 358 comprises a software configuration that can be accessible from the employee scheduling apparatus. The report generation sub-module 358 provides the interface for a manager to generate a report regarding an aspect of the scheduling system, workforce, or a schedule period. For example, using the report generation sub-module 358 an authorized individual, such as a manager, may generate a report listing the schedule history of a particular employee, of a particular shift, or of an employee's violations. The report generation sub-module 358 communicates with at least the database interface 310 software to obtain information regarding employee schedules, or workload history.

Violations Sub-Module

In the example embodiment described herein, the employee schedule module 308 includes a violation sub-module 360. The violations sub-module 360 comprises a software configuration that can be accessible from the employee scheduling apparatus. The violations sub-module 360 provides the interface for a manager to define various types of violations in the system. Broadly defined, a violation is an infraction of the workplace rules or obligations. For example, one type of violation may comprise an employee arriving late and without a valid excuse. Another type of violation might be an employee absence or a rule violation such as unauthorized telephone calls or excessive breaks.

The violations sub-module 360 also allows a manager or authorized user to enter violations, confirm violations or delete violations such as if the violation was recorded in error or assigned to the wrong employee. The violations sub-module 360 communicates with at least the database interface software 310 to obtain and record information regarding employee schedules and employee data.

Security Sub-Module

In the example embodiments described herein, the employee schedule module 308 can access a security sub-module 362. The security sub-module 362 comprises a software configuration accessible from the employee scheduling apparatus. The security sub-module 362 provides the interface for a manager to alter the authorization levels required to access particular data and/or particular aspects of the system. It is contemplated that a manager would have one level of authorization, while an employee would have another, lower level of authorization. Similarly, a manager or the scheduling system assigns each employee a number or password, thereby allowing access by that employee to only certain aspects of the scheduling system. In other embodiments, the employees select their own passwords.

The security sub-module 362 communicates with at least the database interface software 310 to obtain information regarding employee schedules, scheduling data or employee data. In one embodiment, the security level of an employee is stored with the employee data.

Sheets Sub-Module

In the example embodiments described herein, the employee schedule module 308 includes a sheets sub-module 364. The sheets sub-module 364 comprises a software configuration that can be accessible from the employee scheduling apparatus. The sheets sub-module 364 provides the interface for a manager to create, monitor and delete sheets. A "sheet" is a manager created option or sign-up list requesting that employees make voluntary schedule changes based on future anticipated workload. Once created, a sheet is posted, e.g., electronically, by management, thereby allowing workers to sign-up for the specified schedule changes. For example, if management determines that additional workers are required, often because the work load level has changed, then management or any authorized user may create a sheet. In one example configuration, the sheet includes information regarding the shift that the sheet is directed to, whether additional workers or fewer workers are needed, how many more or fewer workers are required, and text entry areas for workers to sign-up for the sheet. Thus, a sheet may be used to add to the number of workers scheduled for a shift or to reduce the number of workers scheduled for a shift.

Once enough workers have signed up on a sheet to satisfy the requirements of the workload, the system automatically closes the sheet. Alternatively, a manager may close the sheet if the anticipated workload change is inaccurate. Sheets may be displayed in any manner including but not limited to display on overhead monitors, transmitted to each worker's terminal, or provided on a web site or other remotely assessable computer server.

It is anticipated that employees may be more or less willing to sign-up for sheets for a particular shift. By way of example, holiday or weekend shifts may be undesirable and hence difficult to obtain the required workforce. In such a situation the sheets sub-module also includes capability to increase the wage paid during the particular undesirable shift as an incentive to sign-up for or accept a shift on a sheet. Other incentives may also be offered instead of an increase in pay, such as time off at a later date, gifts, or a sign-up bonus.

In yet another variation, different employees may be granted different rights to sign-up for a sheet. In one configuration, an employee with a certain level of seniority may be granted first rights to sign-up for a sheet.

The sheets sub-module 364 communicates with at least the database interface software 310 to obtain information regarding employee schedules, scheduling data or employee data.

Data Display Control Sub-Module

In the example embodiments described herein, the employee schedule module 308 includes a data display control sub-module 366. The data display control sub-module 366 comprises a software configuration that can be accessible from the employee scheduling apparatus 222 by one having adequate authorization. The data display control sub-module 366 provides the interface for a manager to control the operation, appearance, and content of the data displayed on that data display apparatus 112, which may optionally be located throughout the work area for viewing by employees. It is anticipated that the data display control sub-module 366 provides means to control the color, organization, content, refresh period, font type, font size, and other similar features of the display. The data display control sub-module 366 communicates with at least the database interface software 310 to obtain information regarding employee schedules and workload history.

Figure 5:
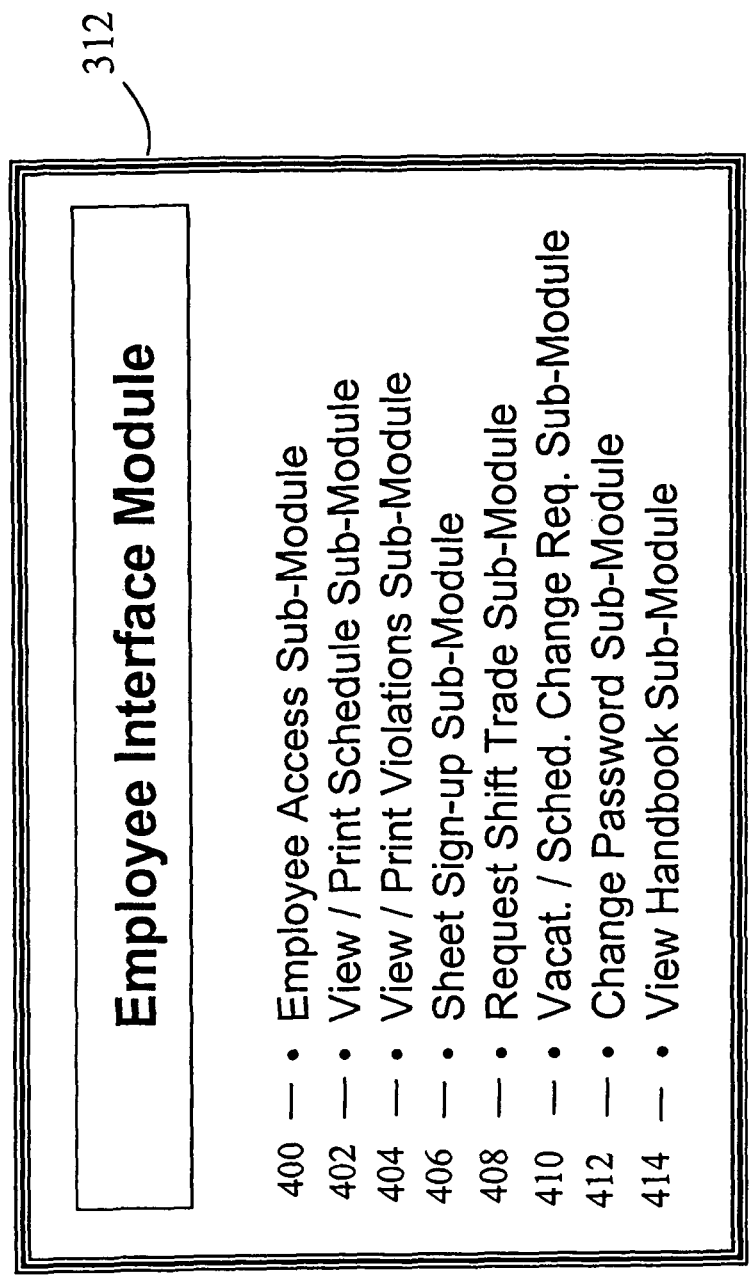
FIG. 5 illustrates exemplary sub-modules that comprise an example embodiment of the employee interface module.

Turning now to FIG. 5, an example compilation of the software sub-modules comprising the employee interface module 312 is shown. In this example embodiment the employee interface module 312 is a configuration of software routines available for interaction primarily by employees, but also by managers, from the one or more kiosks situated throughout the work area. In other configurations, the software components of the employee interface module 312 are accessible from the scheduling interface, from each of one or more employee terminals, or via a network of computer, such as the Internet. The following, in conjunction with FIG. 5, identifies and describes the components or sub-modules that comprise the employee interface module 312.

Employee Access Sub-Module

In the example embodiments described herein, the employee interface module 312 includes an employee access sub-module 400. The employee access sub-module 400 comprises a software configuration that executes on the employee interface apparatus 120. The employee access sub-module 400 provides the interface to control access to the various aspects of the scheduling system via the employee interface module 312. As known by those of ordinary skill in the art, the employee access sub-module 400 requests a user identification or password before allowing employee access to the scheduling system. In an illustrative configuration, the employee access sub-module 400 communicates with the database interface 310 to compare a user entered password to the password stored with the employee data. Of course, the present invention is not limited to a particular method or apparatus for granting access. The password also limits the data that the employee may view to data pertaining to that particular employee.

View/Print Schedule Sub-Module

In the example embodiments described herein, the employee interface module 312 includes a view/print schedule sub-module 402. The view/print schedule sub-module 402 comprises a software configuration that executes on the employee interface apparatus 120. The view/print schedule sub-module 402 provides the software interface for an employee to view and/or print a copy of their schedule for a particular period of time, such as a particular day, week, month, or year. As known by those of ordinary skill in the art, the view/print schedule sub-module 412 utilizes common view and/or print subroutines. The view/print schedule sub-module 402 communicates with the database interface 310 to obtain schedule data.

In another embodiment, the view/print schedule sub-module 402 is configured to e-mail or transmit in some other manner an electronic copy of a particular schedule to a remote location. In yet another configuration, an employee may utilize the scheduling system to download a schedule to a personal computing device, such as a PALM PILOT™ brand personal storage device.

View/Print Violations Sub-Module

The view/print violations sub-module 404 operates in a generally similar manner to the view/print schedule sub-module 402 described above, but is instead configured to provide information to an employee regarding the violations assigned to that particular employee.

Sheet Sign-Up Sub-Module

In the example embodiments described herein, the employee interface module 312 includes a sheet sign-up sub-module 406. The sheet sign-up sub-module 406 comprises a software configuration that executes on the employee interface apparatus 120. The sheet sign-up sub-module 406 provides the software interface for an employee to sign-up for a sheet that is posted on the system. The operation of the system with regard to creation, posting, and sign-up of sheets is discussed below in more detail. The sheet sign-up sub-module 406 automatically determines if the worker attempting to sign-up for the sheet is already scheduled to work that shift, or if allowing the worker to sign-up for that particular sheet would violate any of a number of county, state, or federal labor laws. Likewise, the sheet sign-up sub-module 406 may optionally be configured to determine if an employee is qualified to perform the tasks required on the shift of the sheet. Accordingly, the sheet sign-up sub-module 406 communicates with the database interface 310 to access schedule data and employee data.

Request Shift Trade Sub-Module

In the example embodiments described herein, the employee interface module 312 includes a request shift trade sub-module 408. The request shift trade sub-module 408 comprises a software configuration that executes on the employee interface apparatus 120. The request shift trade sub-module 408 provides the software interface for an employee to request a shift trade. In one embodiment, the management authorizes shift trades. In another embodiment, the request for shift trade advantageously occurs without intervention from management. Each shift change request is sent to an available shift pool or bulletin board that stores posts from individuals requesting shift trades. Each entry in the shift pool may include information such as proposed shift change request, date posted, need to switch before date, or other relevant information. Using the request shift trade subroutine 408, employees may view the entries in shift change requests pool and sign-up to work the shift or trade shifts. In this manner, shift changes can occur without involvement by management. Accordingly, the sheet sign-up sub-module 408 communicates with the database interface 310 to access schedule data and employee data.

Vacation/Schedule Change Request Sub-Module

In the example embodiments described herein, the employee interface module 312 includes a vacation/schedule change request sub-module 410. The vacation/schedule change sub-module 410 comprises a software configuration that executes on the employee interface apparatus 120. The vacation/schedule change request sub-module 410 provides the interface to control the scheduling of vacation time and/or permanent schedule changes in the scheduling system via the employee interface module 312. The vacation/schedule change request sub-module 410 utilizes schedule data and employee data to determine if vacation time is available and if vacation can be granted during the requested period without causing a work force shortage. Likewise, similar determinations are made for permanent schedule changes, such as availability and seniority.

Change Password Sub-Module

In the example embodiments described herein, the employee interface module 312 includes a change password sub-module 412. The change password sub-module 412 comprises a software configuration that executes on the employee interface apparatus 120. The change password sub-module 412 provides the interface to allow an employee to change their password. The change password sub-module 412 communicates with the database interface 310 to access and write to the employee data, which is where employee passwords are stored.

View Handbook Sub-Module

In the example embodiments described herein, the employee interface module 312 includes access to a view handbook sub-module 414. The view handbook sub-module 414 comprises a software configuration that executes on the employee interface apparatus 120. The view handbook sub-module 414 provides a text and graphics viewing interface to allow an employee to view the employee handbook. The view handbook sub-module 414 communicates with the database interface 310 to access the employee handbook.

Figure 6:
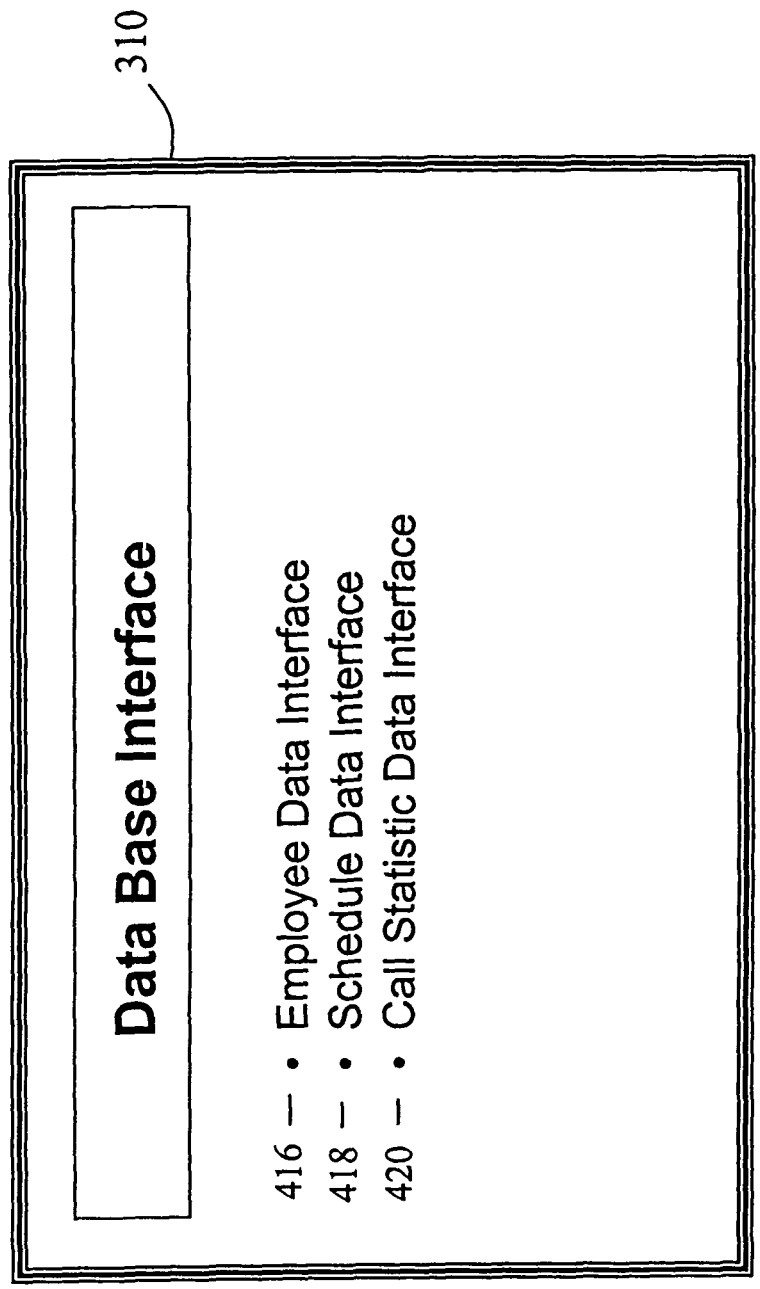
FIG. 6 illustrates exemplary software components that comprise an example embodiment of the database interface.

Turning now to FIG. 6, an example configuration of the sub-modules comprising the database interface 310 is shown. In this example embodiment, the database interface 310 is a configuration of software routines available for interaction by various modules, sub-modules and user interfaces in the scheduling system. The components of the database interface 310 comprise the employee data interface 416, the schedule data interface 418 and call statistic data interface 420. Access via an interface to data stored on a database is known by those of ordinary skill in the art, and accordingly is not discussed in detail herein.

Figure 7:
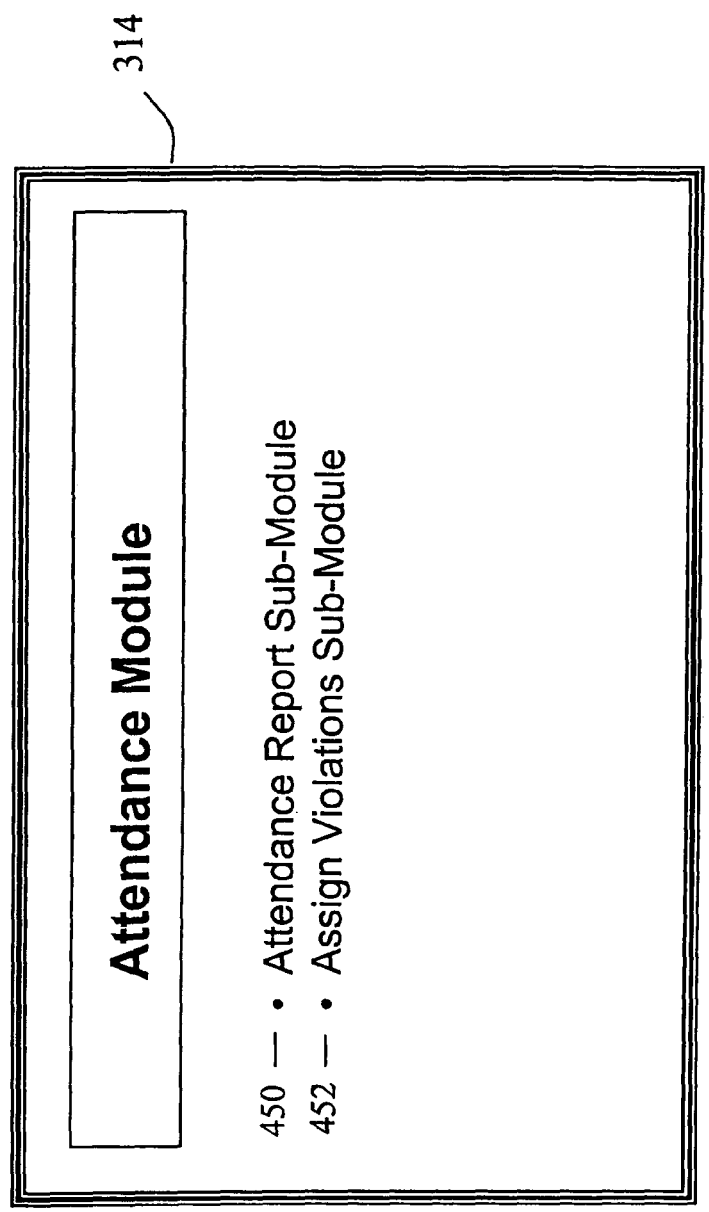
FIG. 7 illustrates exemplary software components that comprise an example embodiment of the attendance module.

FIG. 7 illustrates an attendance module 314 as is contemplated for use with the present invention. The attendance module 314 is a compilation of software running on any or all of the main server, employee scheduling apparatus, or attendance module. In the embodiment described herein, the attendance module 314 executes on the employee scheduling apparatus 120 and interfaces with the main server 200 to obtain information from the order processing software 304 to determine which of the plurality of workers, in this embodiment telephone service agents, are present and actively fielding calls. The attendance module software 314 compares the information regarding active agents from the order processing software 304 and schedule data from the database interface 310 to thereby take attendance of the scheduled employees. In one embodiment, the attendance feature periodically polls the order processing software 304 for worker activity or log-in status.

For example, the attendance module 314 may determine that the number of workers currently in attendance falls short of the number previously scheduled. To make up for this shortfall, the attendance module 314 may feed information representing this attendance shortfall condition to other components of the instant scheduling system, for example the employee scheduling module 308. Then, other components of the instant scheduling system may take action to alleviate this shortfall condition. For example, certain other workers assigned to other shifts that may be about to terminate may be held over, or otherwise have their shifts extended. Also, management may issue sheets (see, e.g., the discussion herein relating to the sheets sub-module 364) to offer other workers the opportunity to work additional hours and thereby reduce or eliminate the shortfall condition. Breaks and lunchtimes for attending employees may be truncated or curtailed. Any of the above remedial actions may be taken with or without additional compensation or incentives to the workers involved, depending on the circumstances. In general, these aspects of the instant invention include detecting attendance shortfalls, and routing information representing this attendance shortfall to other components of the scheduling system, so as to enable those components to take any one or more of several possible scheduling-related actions to remedy or address the shortfall. In this manner, these aspects of the invention give management the flexibility to detect and address such shortfalls before they become crises, preferably in real-time with occurrence such attendance shortfalls.

Those skilled in the art will recognize that the attendance module 314 could also be applied to enable detection and resolution of excessive attendance by workers. This situation could arise from, e.g., mistakes or miscommunications among personnel regarding days, start times, or end times of shifts; desire by workers to work additional time for extra pay, but failing to proceed via proper channels in doing so; flaws in the schedule generation algorithms; or the like. In these excess attendance scenarios, the attendance module 314 can feed information representing this condition to, e.g., the employee scheduling module 308. Resolutions could involve extending lunchtimes, or break times of those employees present, shortening shifts, eliminating shifts, posting sheets that excuse at least some workers from at least portions of upcoming shifts, or the like.

The attendance module 314 includes the following sub-modules.

Attendance Report Sub-Module

In the example embodiments described herein, the attendance module 314 can access an attendance report sub-module 450. In these embodiments, the attendance report sub-module 450 comprises a software configuration. The attendance report sub-module 450 provides a user interface to allow a manager to generate reports regarding the attendance of a particular employee or attendance over a particular period. The attendance report sub-module 450 communicates with the database interface 310 to access the employee data and schedule data.

Attendance Violations Assignment Sub-Module

In the example embodiments described herein, the attendance module 314 can access a violations assignment sub-module 452. The violations assignment sub-module 452 comprises a software configuration designed to interface with the violations sub-module 360 in the employee schedule module 308. The attendance violations assignment sub-module 452 provides a user interface so a manager may enter violations regarding the attendance of a particular employee or other attendance data. In one embodiment, however, the violations assignment sub-module 452 automatically polls attendance and records violations without assistance from management. This advantageously reduces the workload on the management personnel.

Figure 8:
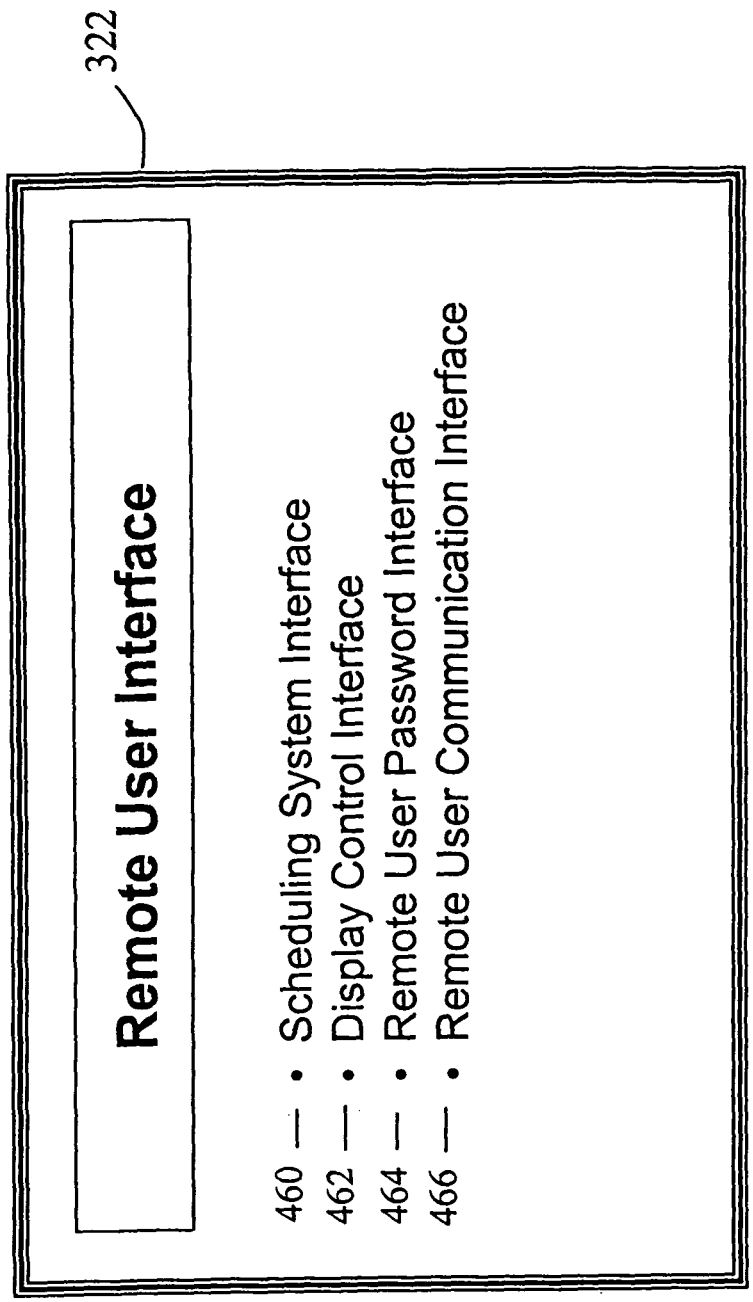
FIG. 8 illustrates exemplary software components that comprise an example embodiment of the remote user interface.

FIG. 8 illustrates the software components of an illustrative remote user interface 322 as is utilized in various embodiments of the present invention. The remote user interface 322 is a configuration of software designed to facilitate access to the schedule data, such as by an employee, from a remote location. In one embodiment, the data is accessed via a telephone line with the aid of a voice response unit. In another illustrative embodiment, the remote user interface 322 comprises one or more computers equipped with network software, such as is utilized to provide access to data over the Internet or other network. It is anticipated that both employees and managers, i.e. individuals with varying levels of access authorization, may utilize the functionality of remote access capability. In one example configuration, the remote user interface 322 comprises a remote computer-based data access system having a scheduling system interface 460, a remote user interface display control 462, a remote user password interface 464, and remote user communications interface 466. Each aspect is discussed below and set-off under separate headings.

Scheduling System Interface

One aspect of the remote user interface 322 is the scheduling system interface. The scheduling system interface 460 serves as a liaison between the scheduling system and the remote user interface 322. The scheduling system interface 460 facilitates the access, entry, and coordination of data between the various modules and interfaces of the scheduling system and the remote user interface 322. The scheduling system interface 460 may include data buffering capability.

Display Control Interface

The remote user interface 322 includes a display control interface 462 to create and change the manner in which the data is displayed to the remote user. The display control interface 462 includes software and hardware to facilitate the storage and presentation of schedule data from the scheduling system and the remote user. As known by one familiar with network software, an interface is utilized to accept information from a remote user and present information to a remote user. In the Internet environment, these interfaces are often referred to as a web page. Hence, the remote user interface includes a number of pages that connect or link to other pages of the scheduling system. Using a network language, such as HTML, the scheduling system interface 460 is configured to provide access to the functionality of the above-described sub-modules and interfaces. To avoid repetition, another detailed discussion of the sub-modules and interfaces of the scheduling system is not provided again. Likewise, those of ordinary skill in the art are familiar with the software and hardware interfaces that push and accept data over a computer network, such as the Internet.

Remote User Password Interface

The remote user password interface 464 oversees access to the system by a remote user based on a remote user password. The remote user password interface 464 operates in accordance with the employee access sub-module of FIG. 5 and is therefore not described again herein.

Remote User Communication Interface

The remote user interface 322 includes apparatus, including software and hardware, to establish and support a communication link between the remote user and the remote user interface. In one embodiment, the remote user communication interface 466 includes a plurality of telephone lines connected to an Internet server. In one embodiment, the remote user interface 322 includes T1 line access, thereby providing access for 48 incoming lines, 47 of which are voice channels and one of which is a data channel. The data channel in conjunction with the T1 card carries and properly assigns ANI data to each of the 47 channels. The remote user interface communications also includes banks of modems with integrated software configured to receive and place calls.

3. Operation

Figure 9:
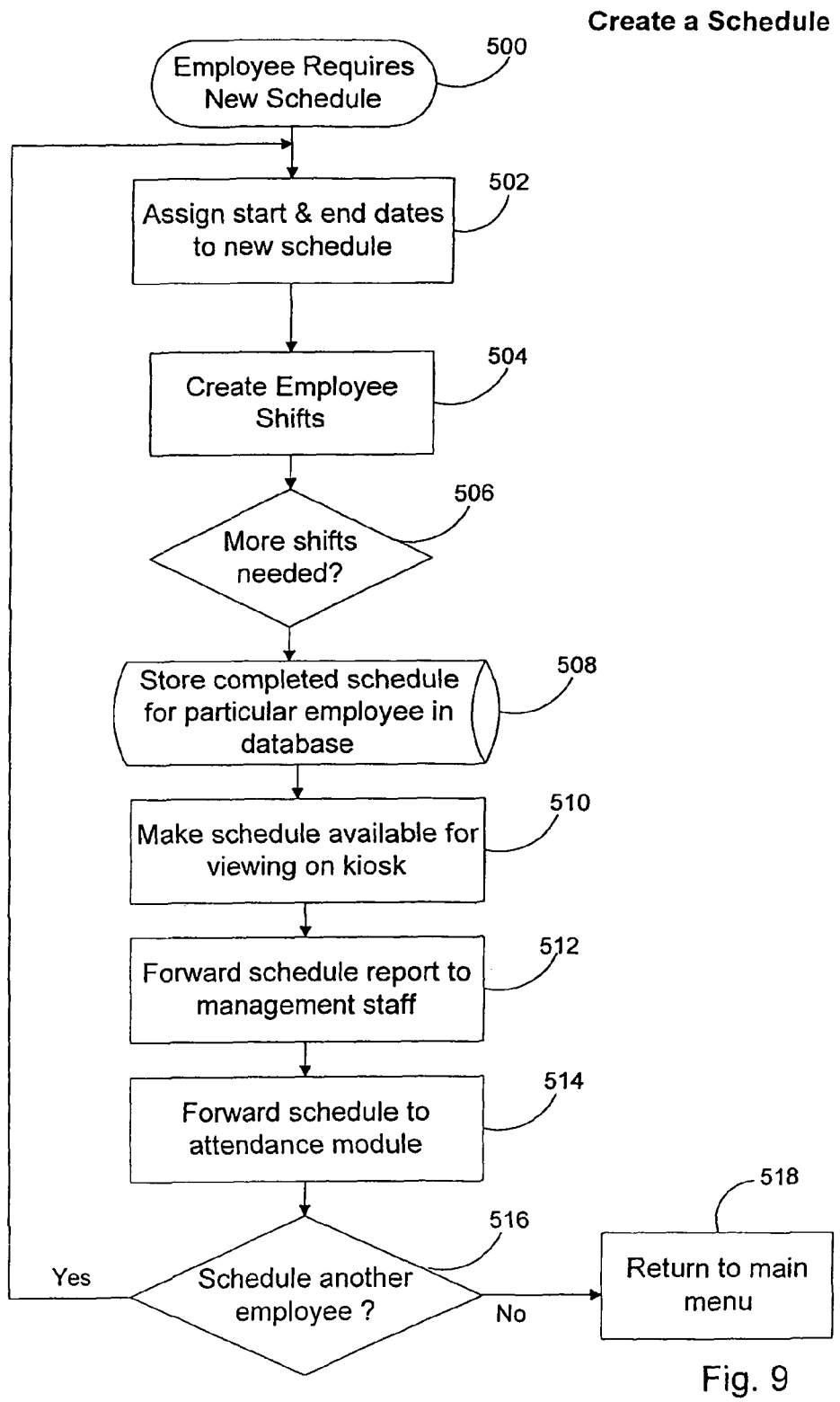
FIG. 9 illustrates an operational flow diagram of an exemplary method of schedule creation and schedule assignment using the present invention.

Turning to FIG. 9, an operational flow diagram of an illustrative process for creating an employee schedule is shown. As is commonly understood in modern workplaces, new employees require work schedules. Likewise, employees requesting a schedule change must be assigned new schedules. Accordingly, the flow diagram of FIG. 9 illustrates the process of the present invention for creating a new schedule for an employee or worker. The operation of FIG. 9 can be executed using a configuration of software executing on one or more computing devices. In the example embodiment described above, the employee scheduling module 308, and in particular, the create employee schedule sub-module 352, contains the routines to create a new schedule. In alternative embodiments, alternative methods of executing the methods of the present invention may be provided.

At a block 500, the operation determines that a new schedule must be created. Next, at a block 502, the operation assigns a start and end date to the new schedule. Hence, a schedule may apply to an employee for a period of weeks, months or years. By way of example, night shifts may be rotated between employees at five month intervals, or schedules may be created to flexibly account for education commitments made by employees.

Next, at a block 504, the operation creates an employee's shifts. This includes the creation of a shift for given days of the week and that assign a start and end time for each day's shift. Likewise, the schedule can be crafted to have any period of repetition or duration. Thus, the functionality of the present invention is not limited to assigning an employee to one of several common shifts. Instead, the scheduling is achieved on an employee-by-employee basis. This arrangement of employee-based scheduling advantageously adds flexibility to the scheduling process, allows employees to have more control and flexibility in selecting a desired schedule, and meets the needs of employees having unique work requirements.

Yet another advantage of the present invention over shift-based scheduling is that all employees do not start and stop work at the end/beginning of shifts. For example, in a shift-based scheduling environment, a shift may end at 5:00 p.m. and another shift may begin at 5:00 p.m. However, in such an arrangement there are no workers actually working exactly at 5:00 p.m. due the change in shift. However, using the principles of the present invention, shift changes can be made to occur at e.g., 10 minutes intervals, thereby causing at least $\frac{5}{6}^{th}$ of an employer's work force to be working at any particular time and not hindered by the shift change. This is particularly desirable in industries having constant worker demand such as continually operating factories, telemarketing, teleservices, or other similar industries.

Next, at a block 506, the system queries the user to determine if additional shifts need to be created for the particular employee. If additional shifts need to be created, the operation returns to a block 504 so the user may create additional shifts for the worker.

Alternatively, if sufficient shifts have been created for the employee, the operation progresses to a block 508, wherein the operation stores the entire schedule for the employee in a database or other storage apparatus. At block 508, the operation stores the data to a database. Next, at a block 510, the schedule data is made available on an employee interface, such as a kiosk. Also, at a block 512, the operation forwards the schedule information to one or more managers. This block may optionally occur only upon the request of a manager.

At a block 514, the operation forwards the updated schedule data to the attendance apparatus. This facilitates the taking of attendance of scheduled employees as is described in detail below in conjunction with FIG. 13.

After the occurrence of these events, the operation progresses to a block 516, wherein the system presents the user with an option to create another schedule for another employee, block 502, or exit the create schedule sub-module, block 518.

This is but one possible method of operation for creating a schedule in a system having the features of the present invention. For example, in other configurations the employee could create a proposed schedule within the available schedule openings. Thus, the system would aid in the scheduling of employees, reducing demands on management.

Further, and as stated above, any number of various methods or routines may be adopted to determine the work force required to properly service a particular workload.

Figure 10:
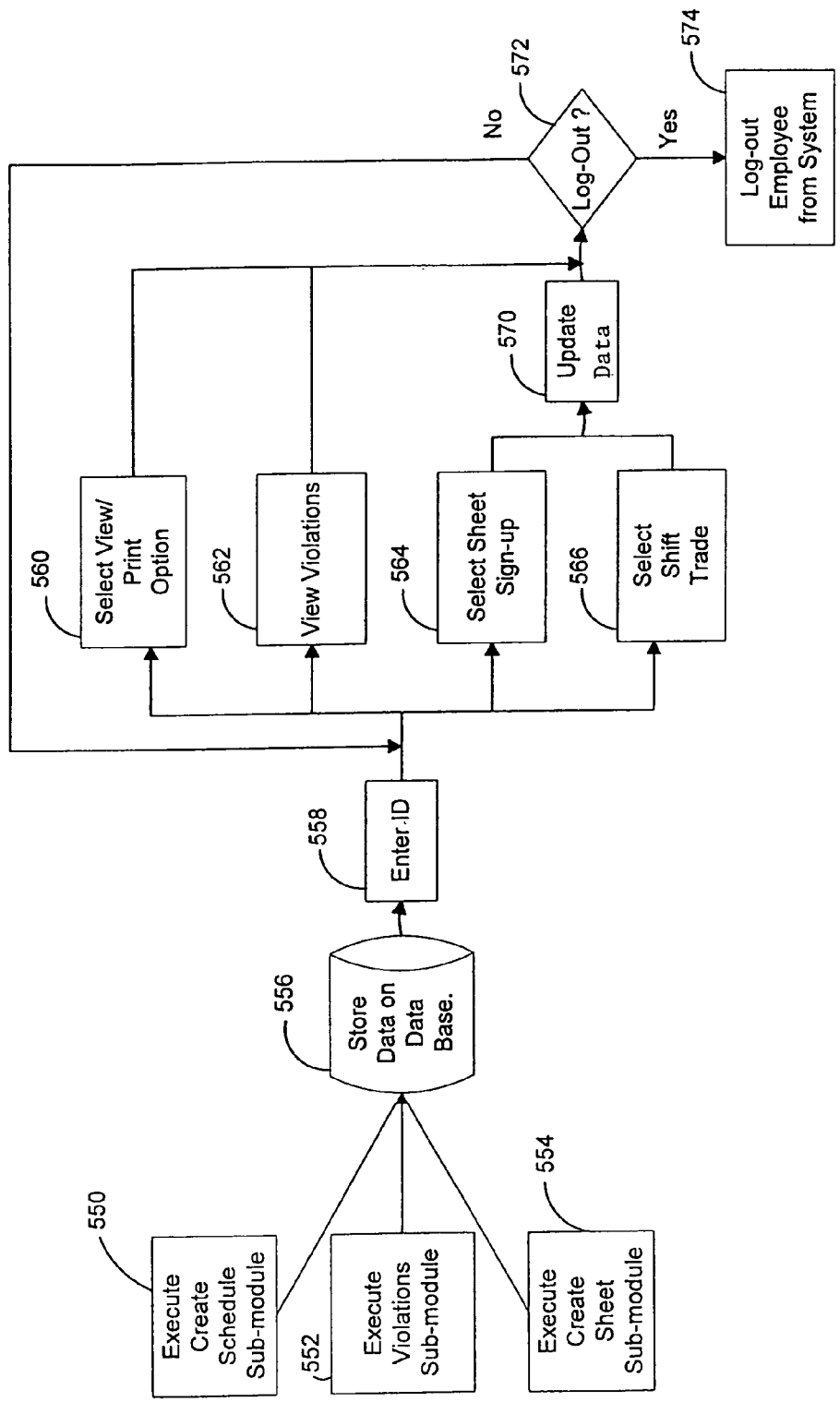
FIG. 10 illustrates an operational flow diagram of an exemplary method of data distribution to employees using the present invention.

Once a plurality of schedules have been created, the present invention provides for distribution of the schedule throughout the system. FIG. 10 illustrates an operational flow diagram of a method of data distribution, such as schedule data, to the employee interfaces. Employee interfaces are referred to for purposes of understanding as kiosks. At any of blocks 550, 552, and 554, the system or an operator creates some form of data. For example, at a block 550, a user may create a schedule; or at a block 552, the system or user establishes a violation; or at a block 554, a manager posts a sheet. Next, at a block 556, the operation stores one or more of these types of events or data on a server database.

Once stored, the system makes the data available to the users of the system in various ways. In the operation described below, it is anticipated that the user would utilize a kiosk to initiate the distribution of data to themselves. Initially, for a user to access the schedule data, the operation requests a user password or a confidential user number. This occurs at a block 558.

Once logged into the system, the operation allows a user to perform any of blocks 560-566. Block 560 allows a user to view or print their schedule, in the case of employees, or any schedule, in the case of managers. Block 562 allows an employee to view violations assigned to them. Block 564 allows a user to sign-up for a sheet. Block 566 allows a user to post or sign-up for a shift trade. All of these functions are described above individually in greater detail. In addition, an operational flow diagram for sheet sign-up, block 564, and shift trade post or sign-up, block 566, is described below in conjunction with FIGS. 11 and 12, respectively.

If a user selects either of block 564, (sheet sign-up), or block 566, (shift trade), the operation progresses to a block 570 so the operation may update the data in the database. Thereafter, all of blocks 560, 562, and 570 progress to a decision block 572 to inquire if the user desires to perform additional functions available from the employee interface, i.e. kiosk, or log-out. If the user chooses to perform additional features, the operation returns to allow additional actions.

Alternatively, the operation progresses to a block 574, and the user is logged out of the system. The log-out procedure can occur automatically, for security purposes, or after manual log-out by the user. In one embodiment, the kiosk is equipped with a sensor, such as an infrared motion detector, to determine when the immediate user has moved away from the kiosk.

Figure 11:
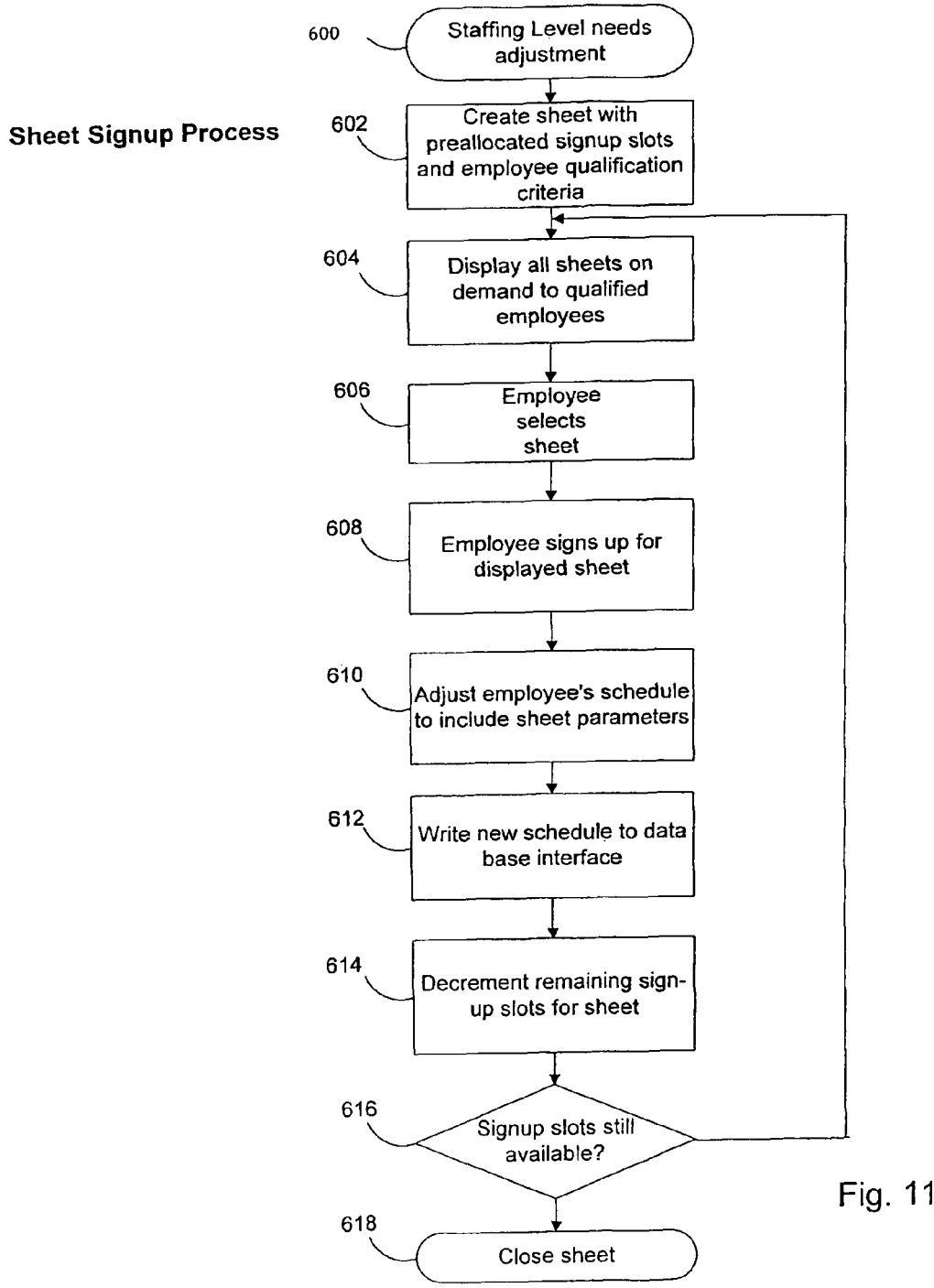
FIG. 11 illustrates an operational flow diagram of an exemplary method for creating sheets and signing up for a posted sheet in accordance with the present invention.

FIG. 11 illustrates an operational flow diagram of one illustrative method of sheet creation and sign-up. As described above, a sheet is a posting by management requesting additional or fewer workers during a particular period of time. A sheet posting allows qualified employees to sign-up for the additional hours, or sign-up to get time-off during the time listed on the sheet. As discussed above, an illustrative event that can prompt either automatic or manual posting of these sheets can be an attendance shortfall or an attendance excess affecting one or more shifts, as indicated by an attendance monitoring system. To execute a sheet sign-up, management or an authorized user determines that the staffing level for a particular period needs adjustment. This occurs at a block 600.

Next, at block 602, the user utilizes the sheet sub-module to create a sheet having pre-allocated sign-up slots and employee qualification criteria. Pre-allocated sign-up slots comprise a listing or opening on which a number of employees needed to adequately staff the time period for which the sheet is created may sign-up. For example, if five additional employees are needed during a particular time period, then a manager creates a sheet with five pre-allocated sign-up slots to cover the particular time period.

Employee qualification criteria limits which employees that may sign-up for the sheet. One illustrative employee qualification criteria comprises the shift period (date and time) covered by the shift on the sheet, since in this embodiment an employee can only sign-up for a sheet if the employee is not already working during the times covered by the sheet. Likewise, employment law may limit the number of hours an employee may work per day or per month.

Another illustrative employee qualification criteria is the qualification level or job description of an employee. In various work environments, employees may have different qualifications and/or job descriptions. In the environment of a telephone call servicing center, some different telephone agents may only be skilled to answer calls regarding particular products or services. In the environment of a large resort-type hotel, different employees may have different job responsibilities. For example, some employees may be assigned to maid services, some employees to food services, and some employees capable of both maid service and food service duties. If a sheet were to require maid service duties, then only certain employees would be qualified to sign-up for a shift on that sheet.

With regard to sheets asking scheduled employees to give up hours, any employee scheduled to work during the time period of the sheet could sign-up to reduce their hours if they were scheduled during the period listed on the sheet. The present invention advantageously includes means to identify and categorize employees into various work classifications.

Returning to FIG. 11, at a block 604 the system displays the newly created sheet on demand of employees logged on the system at the one or more employee interfaces or on the one or more overhead displays. In one embodiment, the employee interface automatically determines the sheets that are available to the employee based on the known qualification level of the employee, and only shows sheets to the employee for which that employee is qualified. Of course, the system displays all posted sheets on the one or more overhead monitors.

In furtherance of the sheet sign-up process, the operation progresses to a block 606, wherein it is anticipated that an employee selects one of one or more posted sheets. Next, at a block 608, the employee reviews the sheet posting and takes blocks to sign-up for the sheet.

Once the employee signs-up for a sheet, the operation adjusts the employee's schedule to include the sheet parameters, block 610, and thereafter writes the schedule change to the database interface, block 612. Next, at block 614, the operation decrements the available slots in the sheet.

At a decision block 616, the operation determines if additional slots are available on the sheet. If slots are available, the operation returns to block 604, and the opportunity is presented for additional employees to sign-up for the sheet. Conversely, if decision block 616 determines that the sheet is full, the operation progresses to block 618, causing the system to close the sheet. This completes one illustrative sheet posting and sheet sign-up process.

Figure 12:
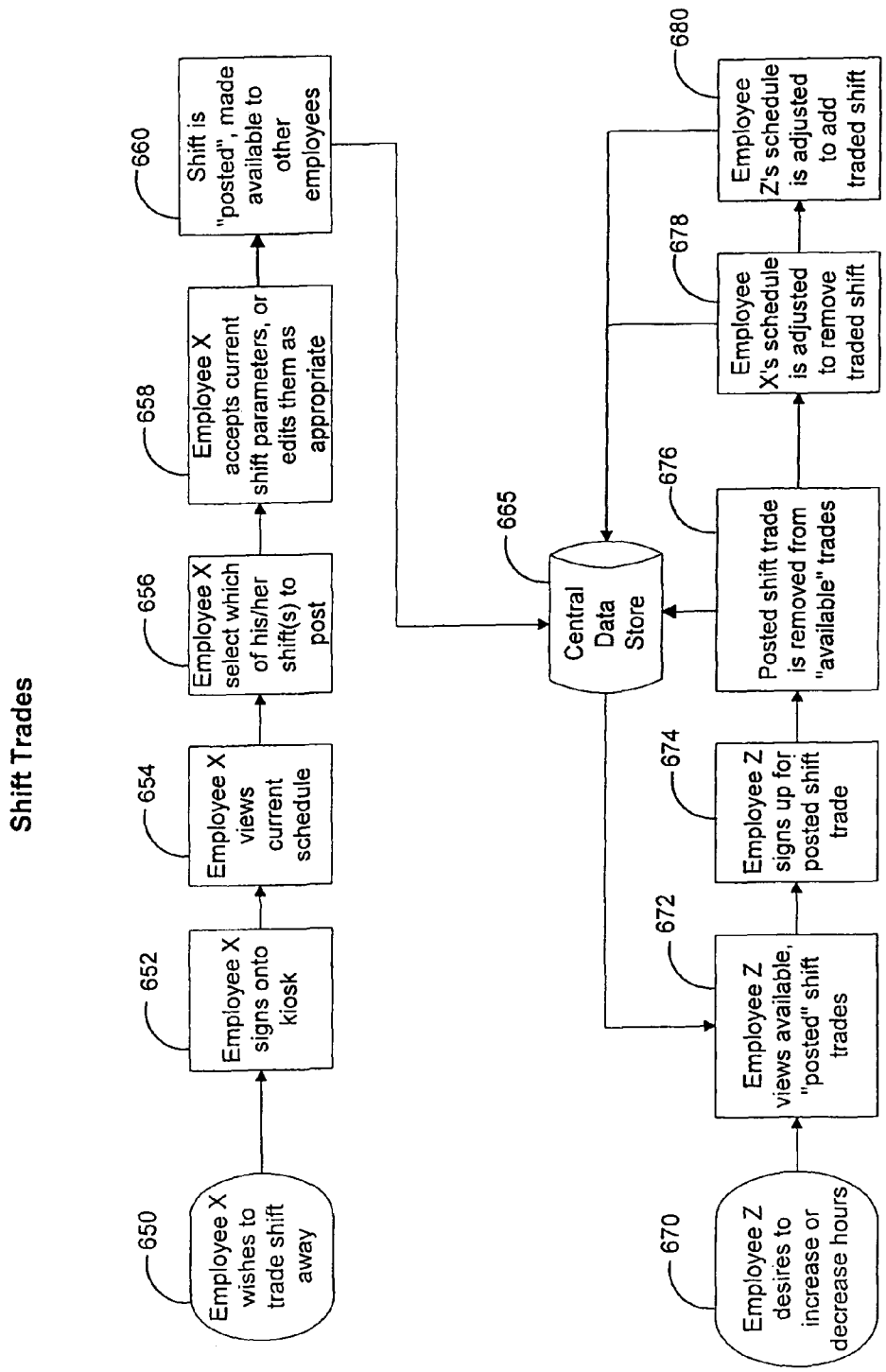
FIG. 12 illustrates an operational flow diagram of an exemplary method for posting and accepting shift trades using the present invention.

Turning to FIG. 12, an operational flow diagram of an illustrative method for posting and accepting shift trades using the present invention, the present invention also includes functionality to dynamically achieve shift trades without intervention of management. Shift trades are distinguished from sheets, in that management creates and posts sheets to adjust the work force during particular periods. In contrast, shift trades comprise an exchange of shifts between at least one employee scheduled to work a particular shift and at least one employee scheduled not to work that particular shift.

To post a shift trade to a common shift trade pool, block 650, an employee desiring to trade a shift, i.e. posting employee, first logs into a kiosk, block 652. Next, at block 654, the employee views their current schedule. Thereafter, at a block 656, the employee selects which of his or her shifts to post to the pool. This is the shift the employee hopes to remove from his or her schedule.

After selecting a shift, the posting employee, at a block 658, is provided an option to edit the parameters of the shift post. Stated another way, the system provides the employee an opportunity to post only a portion of the shift, such as the last half to allow the employee to leave early for vacation, or the first half of a shift to allow time for shopping in the morning. Likewise, the posting employee may set a post period. A post period is a time period or duration during which the system will display the post and allow others to sign-up for the shift. By way of example, an employee may want to post a shift only if they can know at least one week before the shift whether they will have the time off, so that they may have time to adequately plan their vacation or arrange airfare.

At a block 660, the system officially posts the shift, thereby making the shift available to other employees.

At a block 665, the system updates the database regarding the shift post and displays the data in the posted shift pool. It should be noted that the shift posted by the posting employee can be either a request to work fewer hours, i.e. take time off, or a post to request additional hours, i.e., work more.

In response, another employee may respond to the shift trade request, block 670. At a block 672, a responding employee utilizes either of an overhead display or a kiosk to view shift trade posts. Next, the employee accepts a posted shift trade at a kiosk, block 674. Of course, the employee must meet the requirements of the particular shift, as was discussed above with regard to the employee qualification process.

After the employee accepts the shift, the system updates the schedule data in the database, block 676, to remove the shift trade request from the pool of posted shifts. At a block 678, the operation adjusts the posting employee's schedule to account for the executed shift trade by the responding employee. Likewise, at a block 680, the operation adjusts the responding employee's schedule to reflect the change in schedule. Blocks 678 and 680 cause the system to update the schedule data in the database, block 665.

This completes the discussion of one illustrative method of operation for the shift trade software sub-module. It is anticipated that one of ordinary skill in the art could arrive at other particular methods for changing a shift, all of which would be covered by the present invention's posting shift trade requests in a employee scheduling environment.

As discussed above, the present invention advantageously includes attendance or participation monitoring capability. This capability is achieved by means of a compare function. The compare function compares the employees scheduled to work and the employees actually in attendance. The present embodiments provide access to the schedule data via the database interface. Other apparatus or software is used to automatically obtain information regarding which of the scheduled employees are actually present. Of course, in at least one embodiment, the information regarding which employees are actually present may be entered manually.

Figure 13:
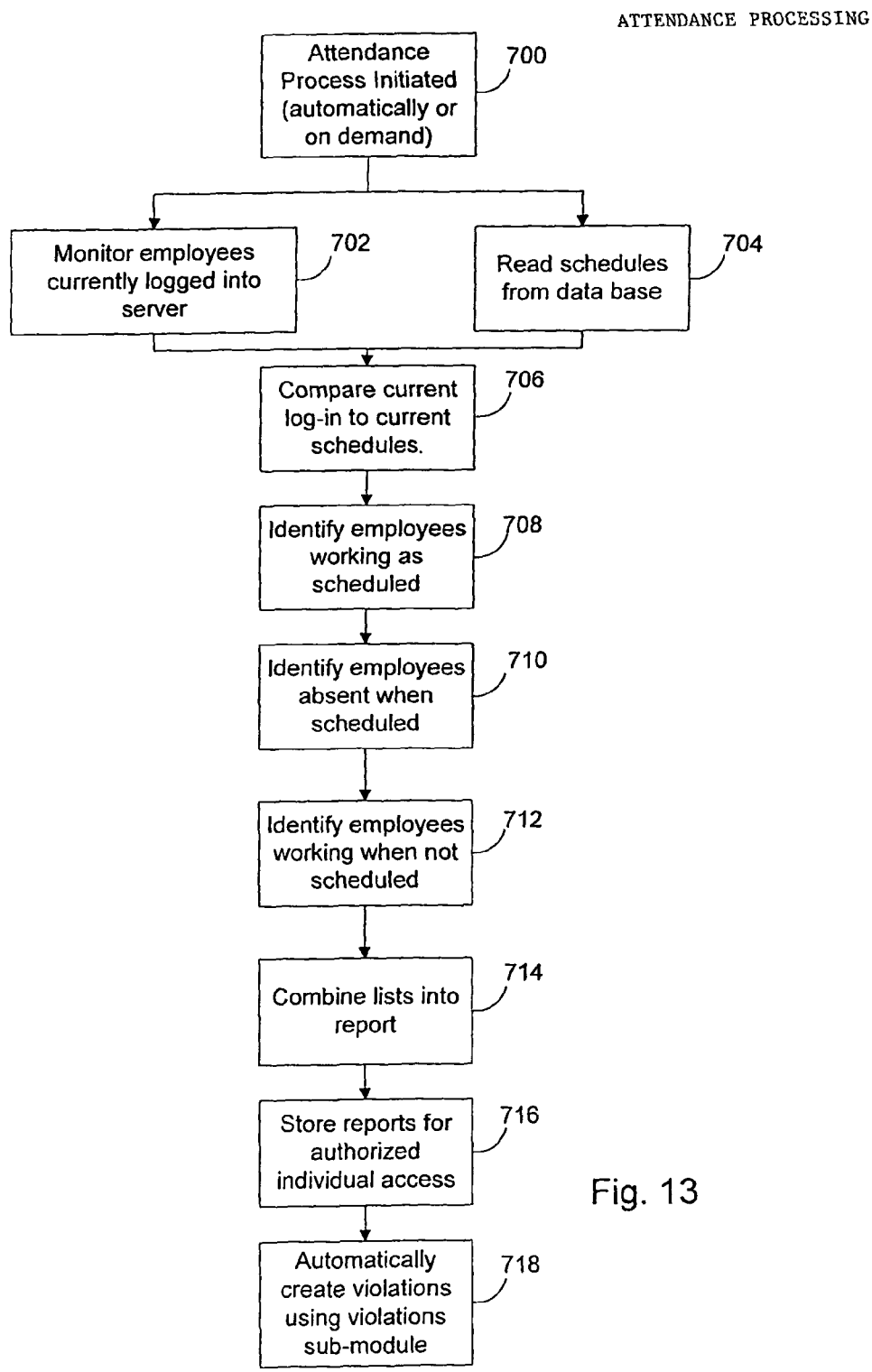
FIG. 13 illustrates an operational flow diagram of an exemplary method of attendance processing using the present invention.

FIG. 13 illustrates an operational flow diagram of one illustrative method of operation of the attendance module. At a block 700, the operation initiates an attendance process. An attendance process comprises the process of comparing and recording scheduled employees who are not at work, and similarly, non-scheduled employees who are at work.

Next, at a block 702 and a block 704, the operation simultaneously reads the current schedules from the database to generate a scheduled employee list to determine who should be working. The system also generates a list of employees actually logged into the system. In the method illustrated in FIG. 13, each employee preferably logs into a computerized network to perform the functions of their job. As explained above, any other method or apparatus of determining which employees are present and working is compatible with and within the scope of the present invention.

Next, at a block 706, the operation compares the two lists so that at a block 708, the system can identify the employees who are working as scheduled. At a block 710, the system identifies the employees who are absent, but are nevertheless scheduled to work. At a block 712, the system identifies the employees who are working but are not scheduled to work.

In response, the system automatically combines this information into reports, block 714. The system stores these reports on the scheduling system for optional viewing by management, block 716. Finally, at block 718, the scheduling system automatically records the employees working but not scheduled and the employees scheduled but not working in the violations sub-module so that the system may optionally assign violations to employees.

As discussed above, the data resulting from the above comparison, in the form of, e.g., the reports referenced above, may serve as an input or driver that may prompt the generation of sheets to remedy an attendance shortfall or excess, or any remedial measure otherwise recognized as appropriate by those skilled in the art.

4. Alternative Embodiments

In alternative embodiments, the scheduling system of the present invention is configured as a stand-alone system independent of a main computer. It is anticipated that these alternative embodiments would find usefulness in a smaller work environment, such as one not equipped with one or more large main-frame computers. As shown in FIG. 14, the present invention can be configured as a software program running on a personal computer 750. In these embodiments, the scheduling computer comprises a computer having a Pentium® or other suitable processor, a hard disk drive, some form of data entry device and display.

Optionally connected to the scheduling computer is a data display apparatus 752 configured to display schedule data to a plurality of individuals. The data display apparatus 752 connects to some form of video display device in the scheduling computer 750.

Also connected to the scheduling computer is one or more employee interface apparatus 754. The employee interface apparatus, or kiosk, is located at one or more different locations within the work place. The kiosks may have similar functionality as that described above regarding the employee interface module. However, it is within the scope of the present invention to alter the features of the scheduling computer and employee interface to account for the variations between small work environments and large work environments. One such example would allow employees to log into their personal computers to ascertain their schedule.

Also included in these alternative embodiments is access to the Internet 760 to facilitate participation by a remote user. Any manner of Internet 760 access is compatible with this embodiment.

These embodiments can also include an optional attendance apparatus 762. The attendance apparatus 762 compares schedule data with a tabulation of the workers present during a shift to arrive at an attendance or listing of the scheduled employees actually reporting to work. In one configuration, the attendance apparatus 762 includes an interface with an electronic time clock. The electronic time clock records the employees who are present at work, and the interface reports the same to a software routine running within the scheduling software on the computer 750. In this manner, attendance is taken and violations can be generated for use in the manner described above. In alternative embodiments, the attendance apparatus may comprise any of a number of different apparatus or methods for recording which employees are present during a work shift. These methods and apparatus include, but are not limited to, access cards, I.D. tags with automatic readers, manual attendance methods, cameras or electronic sensors, networks sensors to determine network log-in status, or use monitors to determine of the employee's business tools are in use. As discussed above, the attendance data can be input to other aspects of the scheduling system to remedy any attendance shortfall or excess detected by the attendance apparatus 762.

The stand-alone system of the alternative embodiments described above operates in a manner similar to that described in conjunction with FIGS. 9-13, and accordingly is not described again herein. Variations in the method of operation, as would be understood by one of ordinary skill in the art, arising due to the absence of a mainframe computer as a central system, are within the scope of the present invention.

Computer-Readable Media

A suitable application program can implement software residing on a computer-readable medium or media (not shown) and embodying the various aspects of the method discussed herein and shown in the drawing figures, and can be coded using any suitable programming or scripting language. However, it is to be understood that the invention as described herein is not dependent on any particular operating system, environment, or programming language. Illustrative operating systems include without limitation LINUX™, UNIX™, or any of the Windows™-family of operating systems, and illustrative languages include without limitation a variety of structured and object-oriented languages such as C™, C++™, Visual Basic™, or the like.

As those skilled in the art will understand, a program of instructions embodying the methods taught herein can be loaded and stored onto a program storage medium or device that is readable by a computer or other machine, thereby becoming executable by the machine to perform the various aspects of the invention as discussed and claimed herein, and as illustrated in the drawing figures. Generally speaking, the program storage medium can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, the program storage device can be affixed either permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figure attached hereto.

Those skilled in the art, when reading this description, will understand that unless expressly stated to the contrary, the use of the singular or the plural number herein is illustrative, rather than limiting, of the instant invention. Accordingly, where a given term is discussed in the singular number, it will be well understood that the invention also contemplates a plural number of the item corresponding to the given term and vice versa, unless expressly stated herein to the contrary.

Those skilled in the art will further recognize that for the purposes of convenience, legibility, and clarity, various data stores or databases are illustrated herein as separate entities, and are discussed separately. However, as to these data stores in particular, the embodiments shown herein are illustrative rather than limiting, and that some or all of these various data stores could readily be combined or consolidated into one or more data stores or databases without departing from the scope of the invention.

The term "data store" herein refers to any storage medium capable of storing data, whether realized using semiconductor, magnetic, or optical technology. This term can also include abstract data structures supported by any number of programming languages, with non-limiting examples including queues, stacks, linked lists or the like, all of which are implemented at the machine level by disk storage, semiconductor memory, optical media, or the like. If a given data store is implemented as a database, this database can take the form of a relational database, an object-oriented database, and any combination thereof, or any other known database technology. Suitable database server programs are readily available from a variety of vendors, including IBM/Informix, Microsoft, Oracle, or the like.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims. While particular embodiments and examples of the present invention have been described above, it should be understood that they have been presented by way of example only and not as limitations. Those of ordinary skill in the art will readily appreciate that other various embodiments or configurations adopting the principles of the subject invention are possible. The breadth and scope of the present invention is defined by the following claims and their equivalents, and is not limited by the particular embodiments described herein.

What is claimed is:

1. A computer program product for scheduling at least one of a plurality of employees to a work shift based on identified changes of a workload in the work shift, anticipated undesirability for the work shift, and adjusted workforce requirements, wherein said computer program product is recorded on a non-transitory computer readable medium and having one or more computer software written thereon that when executed by a computer hardware processor, causes the computer hardware processor to execute the steps of a method comprising:

storing work schedules of the plurality of employees;

checking attendance of the plurality of employees utilizing the work schedules and a presence of the plurality of employees during the work schedules;

determining violations of the plurality of employees, wherein said violations comprise at least one of absence infractions of the plurality of employees and attendance infractions of the plurality of employees;

identifying the changes of the workload in the work shift as either an attendance excess or an attendance shortfall and, when the attendance excess is identified in the work shift, implementing at least one resolution selected from a group consisting of: extending lunchtimes of the plurality of employees, extending break times of the plurality of employees, shortening the work shift, and eliminating the work shift, when the attendance shortfall is identified in the work shift, implementing at least one other resolution selected from another group consisting of: extending the work shift for the plurality of employees, offering other employees the opportunity to work additional hours in the work shift, and truncating breaks and lunchtimes for the plurality of employees;

anticipating whether the work shift is undesirable to the plurality of employees, and when the work shift is anticipated as undesirable to the plurality of employees, provide the plurality of employees at least one incentive selected from a group consisting of: an increase in pay, a time off at a later date, gifts and a sign up bonus to accept the work shift;

adjusting the workforce requirements in the work shift at specific time intervals to ensure continuous availability of a workforce ratio from a total workforce of the plurality of employees;

displaying said work shift to at least one of the plurality of employees;

scheduling at least one of the plurality of employees to the work shift based on the identified changes in the workload of the work shift, the implementing of the at least one resolution and the at least one other resolution in response to the identified changes, the anticipated desirability for the work shift, and the adjusted workforce requirements.

2. A computer implemented method for scheduling at least one of a plurality of employees to a work shift based on identified changes of a workload in the work shift, anticipated undesirability for the work shift, and adjusted workforce requirements, the computer implemented method comprising:

storing, by a computer hardware processor, work schedules of the plurality of employees;

checking, by the computer hardware processor, attendance of the plurality of employees utilizing the work schedules and a presence of the plurality of employees during the work schedules;

determining, by the computer hardware processor, violations of the plurality of employees, wherein said violations comprise at least one of absence infractions of the plurality of employees and attendance infractions of the plurality of employees;

identifying, by the computer hardware processor, the
changes of the workload in the work shift as either an
attendance excess or an attendance shortfall and,
when the attendance excess is identified in the work
shift, implementing at least one resolution selected
from a group consisting of: extending lunchtimes of
the plurality of employees, extending break times of
the plurality of employees, shortening the work shift,
and eliminating the work shift,
when the attendance shortfall is identified in the work
shift, implementing at least one other resolution
selected from another group consisting of: extending
the work shift for the plurality of employees, offering
other employees the opportunity to work additional
hours in the work shift, and truncating breaks and
lunchtimes for the plurality of employees;
anticipating, by the computer hardware processor, whether
the work shift is undesirable to the plurality of employees, and when the work shift is anticipated as undesirable to the plurality of employees, provide the plurality
of employees at least one incentive selected from a
group consisting of: an increase in pay, a time off at a
later date, gifts and a sign up bonus to accept the work
shift;
adjusting, by the computer hardware processor, the workforce requirements in the work shift at specific time
intervals to ensure continuous availability of a workforce ratio from a total workforce of the plurality of
employees;
displaying, by the computer hardware processor, said work
shift to at least one of the plurality of employees;
scheduling, by the computer hardware processor, at least
one of the plurality of employees to the work shift based
on the identified changes in the workload of the work
shift, the implementing of the at least one resolution and
the at least one other resolution in response to the identified changes, the anticipated desirability for the work
shift, and the adjusted workforce requirements.

3. A system for scheduling at least one of a plurality of
employees to a work shift based on identified changes of a
workload in the work shift, anticipated undesirability for the
work shift, and adjusted workforce requirements, the system
comprising: a hardware computer processor and one or more
components of the hardware computer processor programmed to:

store, work schedules of the plurality of employees;
check, attendance of the plurality of employees utilizing
the work schedules and a presence of the plurality of
employees during the work schedules;
determine, violations of the plurality of employees,
wherein said violations comprise at least one of absence
infractions of the plurality of employees and attendance
infractions of the plurality of employees;
identify, the changes of the workload in the work shift as
either an attendance excess or an attendance shortfall
and,
when the attendance excess is identified in the work
shift, implementing at least one resolution selected
from a group consisting of: extending lunchtimes of
the plurality of employees, extending break times of
the plurality of employees, shortening the work shift,
and eliminating the work shift,
when the attendance shortfall is identified in the work
shift, implementing at least one other resolution
selected from another group consisting of: extending
the work shift for the plurality of employees, offering
other employees the opportunity to work additional
hours in the work shift, and truncating breaks and
lunchtimes for the plurality of employees;
anticipate, whether the work shift is undesirable to the
plurality of employees, and when the work shift is anticipated as undesirable to the plurality of employees, provide the plurality of employees at least one incentive
selected from a group consisting of: an increase in pay, a
time off at a later date, gifts and a sign up bonus to accept
the work shift;
adjust, the workforce requirements in the work shift at
specific time intervals to ensure continuous availability
of a workforce ratio from a total workforce of the plurality of employees;
display, said work shift to at least one of the plurality of
employees;
schedule, at least one of the plurality of employees to the
work shift based on the identified changes in the workload of the work shift, the implementing of the at least
one resolution and the at least one other resolution in
response to the identified changes, the anticipated desirability for the work shift, and the adjusted workforce
requirements.

* * * * *